US012664635B2

(12) United States Patent
Shimada et al.

(10) Patent No.: US 12,664,635 B2
(45) Date of Patent: Jun. 23, 2026

(54) IMAGE PROCESSING DEVICE, IMAGING APPARATUS, IMAGE PROCESSING METHOD, AND IMAGE PROCESSING PROGRAM

(71) Applicant: FUJIFILM Corporation, Tokyo (JP)

(72) Inventors: Tomoharu Shimada, Saitama (JP);
Shinichi Shimotsu, Saitama (JP);
Tetsuya Fujikawa, Saitama (JP);
Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 232 days.

(21) Appl. No.: 18/611,671

(22) Filed: Mar. 20, 2024

(65) Prior Publication Data

US 2024/0233105 A1     Jul. 11, 2024

Related U.S. Application Data

(63) Continuation of application No. PCT/JP2022/030412, filed on Aug. 9, 2022.

(30) Foreign Application Priority Data

Sep. 27, 2021    (JP) ................................. 2021-156432

(51) Int. Cl.
*G06T 7/00*        (2017.01)
*G06T 11/00*       (2006.01)
(Continued)

(52) U.S. Cl.
CPC ............ *G06T 7/0002* (2013.01); *G06T 11/00* (2013.01); *G06V 10/44* (2022.01); *H04N 23/11* (2023.01);
(Continued)

(58) Field of Classification Search
CPC ................... G06T 7/0002; G06T 11/00; G06V 2207/10048; G06T 2207/20084; G06V 10/44; H04N 23/55; H04N 23/11
See application file for complete search history.

(56) References Cited

U.S. PATENT DOCUMENTS 4,933,983 A     6/1990  Hiramatsu et al.
7,579,577 B2 *  8/2009  Ono ....................... G03B 15/00
                                                    250/226

(Continued)

FOREIGN PATENT DOCUMENTS

JP          S62188952        8/1987
JP          H0962839         3/1997
(Continued)

OTHER PUBLICATIONS

"International Search Report (Form PCT/ISA/210) of PCT/JP2022/030412", mailed on Oct. 11, 2022, with English translation thereof, pp. 1-5.

(Continued)

*Primary Examiner* — Shaghayegh Azima
(74) *Attorney, Agent, or Firm* — JCIPRNET

(57)        ABSTRACT

The present disclosure provides an image processing device, an imaging apparatus, an image processing method, and an image processing program capable of accurately extracting an abnormal region of a subject from an image. In the image processing device according to one aspect of the present invention, a processor generates a first mask image showing a first region where an abnormality exists on a surface of a subject and a second region including a region where an abnormality exists inside the subject, based on a visible image and a first near-infrared image, acquires a second near-infrared image of the subject captured with light in a second wavelength range in a state where the subject is held in focus with the light in the second wavelength range, and extracts an abnormal region in the first region and the second region based on the first mask image and the second near-infrared image.

20 Claims, 16 Drawing Sheets

(51) Int. Cl.
    *G06V 10/44*        (2022.01)
    *H04N 23/11*        (2023.01)
    *H04N 23/55*        (2023.01)

(52) U.S. Cl.
    CPC ... *H04N 23/55* (2023.01); *G06T 2207/10048*
        (2013.01); *G06T 2207/20084* (2013.01)

(56)           References Cited

U.S. PATENT DOCUMENTS

| | | | |
|---|---|---|---|
| 2011/0050884 A1* | 3/2011 | Niedermeier | G01N 21/9036 |
| | | | 382/142 |
| 2014/0067574 A1* | 3/2014 | Miyakoshi | G06Q 20/208 |
| | | | 705/23 |
| 2017/0352133 A1* | 12/2017 | Toda | G06T 5/70 |
| 2018/0059014 A1 | 3/2018 | Ruback et al. | |

FOREIGN PATENT DOCUMENTS

| | | |
|---|---|---|
| JP | 2005016995 | 1/2005 |
| JP | 2011089978 | 5/2011 |
| JP | 2014052800 | 3/2014 |
| JP | 2014085300 | 5/2014 |
| JP | 2020051981 | 4/2020 |

OTHER PUBLICATIONS

"Written Opinion of the International Searching Authority (Form PCT/ISA/237) of PCT/JP2022/030412", mailed on Oct. 11, 2022, with English translation thereof, pp. 1-7.

\* cited by examiner

FIG. 6

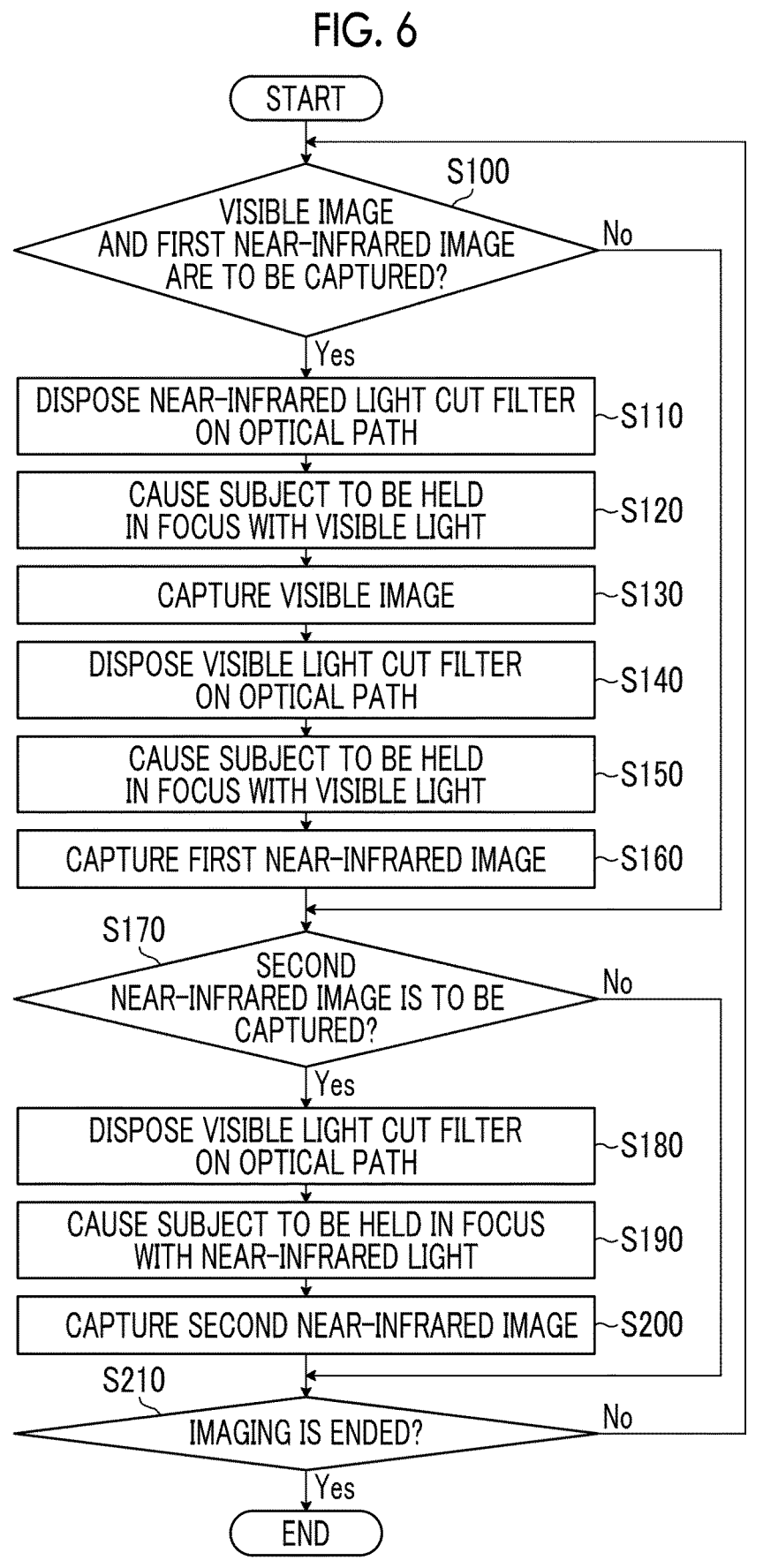

START

S100
VISIBLE IMAGE
AND FIRST NEAR-INFRARED IMAGE
ARE TO BE CAPTURED?  — No

| Yes

DISPOSE NEAR-INFRARED LIGHT CUT FILTER
ON OPTICAL PATH  — S110

CAUSE SUBJECT TO BE HELD
IN FOCUS WITH VISIBLE LIGHT  — S120

CAPTURE VISIBLE IMAGE  — S130

DISPOSE VISIBLE LIGHT CUT FILTER
ON OPTICAL PATH  — S140

CAUSE SUBJECT TO BE HELD
IN FOCUS WITH VISIBLE LIGHT  — S150

CAPTURE FIRST NEAR-INFRARED IMAGE  — S160

S170
SECOND
NEAR-INFRARED IMAGE IS TO BE
CAPTURED?  — No

| Yes

DISPOSE VISIBLE LIGHT CUT FILTER
ON OPTICAL PATH  — S180

CAUSE SUBJECT TO BE HELD IN FOCUS
WITH NEAR-INFRARED LIGHT  — S190

CAPTURE SECOND NEAR-INFRARED IMAGE  — S200

S210
IMAGING IS ENDED?  — No

| Yes

END

FIG. 8A
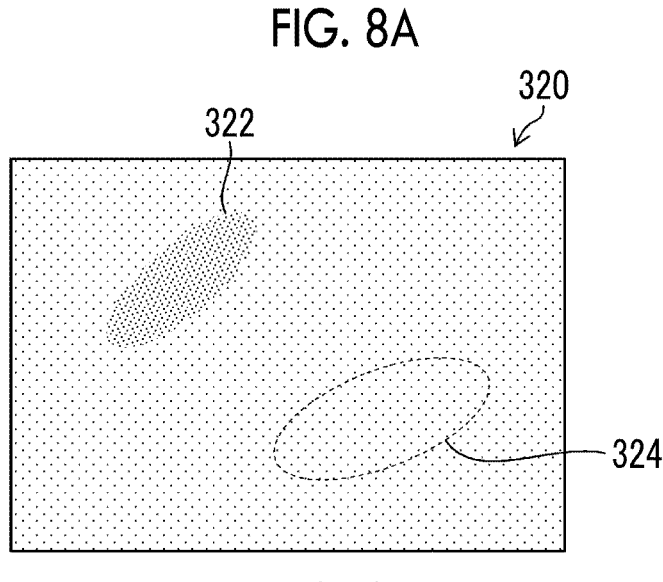
FIG. 8B
FIG. 8C
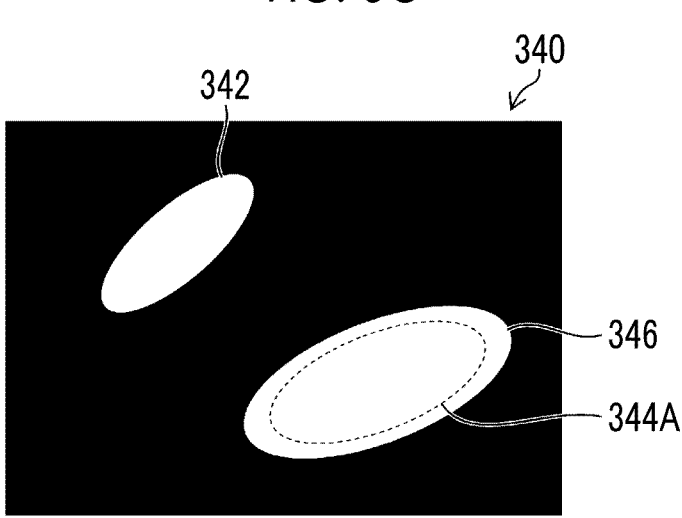

400

402

404

410

413 412

414

418

IMAGE PROCESSING DEVICE, IMAGING APPARATUS, IMAGE PROCESSING METHOD, AND IMAGE PROCESSING PROGRAM

CROSS-REFERENCE TO RELATED APPLICATIONS

The present application is a Continuation of PCT International Application No. PCT/JP2022/030412 filed on Aug. 9, 2022 claiming priority under 35 U.S.C § 119(a) to Japanese Patent Application No. 2021-156432 filed on Sep. 27, 2021. Each of the above applications is hereby expressly incorporated by reference, in its entirety, into the present application.

BACKGROUND OF THE INVENTION

1. Field of the Invention

The present invention relates to an image processing device, an imaging apparatus, an image processing method, and an image processing program that are used to extract an abnormal region from an image of a subject.

2. Description of the Related Art

With regard to a technique for extracting an abnormal region from an image, for example, JP2014-052800A discloses that feature amounts are individually extracted from a visible light image and a near-infrared image obtained by imaging. In addition, JP2020-051981A discloses that flaws are individually extracted from a visible light image and a near-infrared image obtained by imaging.

SUMMARY OF THE INVENTION

By comparing an image of a visible light region with an image of a near-infrared light region, it is possible to detect, for example, an internal dent of a fruit. In order to know an exact size of an abnormal portion such as a dent, it is necessary to perform imaging at a focal position of near-infrared light where the abnormality is detected. On the other hand, even in a case in which the abnormal portion is to be extracted by calculating a difference between a visible image captured at a focal position of visible light and a near-infrared image captured at a focal position of near-infrared light, the difference becomes large and it is difficult to extract only the abnormal portion because a degree of blurriness is very different even for a portion having no abnormality. However, the techniques in the related art, such as those disclosed in JP2014-052800A and JP2020-051981A, do not sufficiently take such circumstances into consideration.

One embodiment according to the technique of the present disclosure provides an image processing device, an imaging apparatus, an image processing method, and an image processing program capable of accurately extracting an abnormal region of a subject from an image.

A first aspect of the present invention provides an image processing device comprising: a processor, in which the processor acquires a visible image of a subject captured with light in a first wavelength range including a visible light wavelength range in a state where the subject is held in focus with the light in the first wavelength range, acquires a first near-infrared image of the subject captured with light in a second wavelength range that includes a near-infrared light wavelength range and is different from the first wavelength range in a state where the subject is held in focus with the light in the first wavelength range, generates a first mask image showing a first region where an abnormality exists on a surface of the subject and a second region including a region where an abnormality exists inside the subject, based on the visible image and the first near-infrared image, acquires a second near-infrared image of the subject captured with the light in the second wavelength range in a state where the subject is held in focus with the light in the second wavelength range, and extracts an abnormal region in the first region and the second region based on the first mask image and the second near-infrared image.

In the first aspect and each of the following aspects, the term "abnormal region" refers to a region where an abnormality such as damage or deformation exists. In the present invention, the "abnormal region" is not limited to a region where such inconvenience or defect exists, and may be a "region that is normal or typical but has a feature different from that of a surrounding region (a region with a different constituent substance, density, temperature, or the like)". In addition, the "abnormal region" can be defined for both the surface of the subject and the inside thereof. Specific examples of the abnormal region will be described below in the section of "Examples of Observation Target and Abnormal Region in Present Invention".

A second aspect provides the image processing device according to the first aspect, in which the processor acquires images, which are captured using a near-infrared light wavelength range as the second wavelength range, as the first near-infrared image and the second near-infrared image.

A third aspect provides the image processing device according to the first or second aspect, in which the processor acquires images, which are captured using a wavelength range including visible light and near-infrared light as the second wavelength range, as the first near-infrared image and the second near-infrared image.

A fourth aspect provides the image processing device according to any one of the first to third aspects, in which the processor generates the first mask image based on a difference between the visible image and the first near-infrared image.

A fifth aspect provides the image processing device according to any one of the first to fourth aspects, in which the processor generates the first mask image by inputting the visible image to a first neural network for abnormality detection.

A sixth aspect provides the image processing device according to any one of the first to fifth aspects, in which the processor generates a second mask image by inputting the visible image or the first near-infrared image to a second neural network for abnormality detection, and extracts the abnormal region by further using the second mask image.

A seventh aspect provides the image processing device according to any one of the first to sixth aspects, in which the processor extracts a peripheral edge portion of the abnormal region as a contour.

An eighth aspect provides the image processing device according to any one of the first to seventh aspects, in which the processor determines whether or not to acquire the second near-infrared image based on a detection result of the abnormal region in the first mask image.

A ninth aspect provides the image processing device according to any one of the first to eighth aspects, in which the processor determines whether or not to acquire the second near-infrared image based on a difference between the first wavelength range and the second wavelength range.

A tenth aspect provides the image processing device according to any one of the first to ninth aspects, in which the processor displays a region where the first mask image exists in the visible image and/or the first near-infrared image such that the region is identified from the other region.

An eleventh aspect of the present invention provides an image processing device comprising: a processor, in which the processor acquires a visible image of a subject captured with light in a first wavelength range including a visible light wavelength range in a state where the subject is held in focus with the light in the first wavelength range, acquires a first near-infrared image of the subject captured with light in a second wavelength range that includes a near-infrared light wavelength range and is different from the first wavelength range in a state where the subject is held in focus with the light in the first wavelength range, generates a first mask image showing a first region where an abnormality exists on a surface of the subject and a second region including a region where an abnormality exists inside the subject, based on the visible image and the first near-infrared image, and determines whether or not to acquire a second near-infrared image of the subject captured with the light in the second wavelength range in a state where the subject is held in focus with the light in the second wavelength range, based on a detection result of the abnormality in the first mask image.

A twelfth aspect provides the image processing device according to the eleventh aspect, in which, in a case in which it is determined to acquire the second near-infrared image, the processor acquires the second near-infrared image, and extracts an abnormal region in the first region and the second region based on the first mask image and the second near-infrared image.

A thirteenth aspect of the present invention provides an imaging apparatus comprising: an optical system that transmits light in the first wavelength range and light in the second wavelength range; an optical filter switching mechanism for disposing, on an optical path of the optical system, any of a first optical filter that reduces a transmittance of at least a part of the light in the first wavelength range or a second optical filter that reduces a transmittance of at least a part of the light in the second wavelength range; an imaging element that outputs an image signal corresponding to the light transmitted through the optical system, the first optical filter, or the second optical filter; and the image processing device according to any one of the first to twelfth aspects, in which the processor acquires the visible image, the first near-infrared image, and the second near-infrared image based on the image signal output from the imaging element.

A fourteenth aspect provides the imaging apparatus according to the thirteenth aspect, in which the optical system includes an in-focus position adjustment lens, and the processor stores in-focus position information indicating an in-focus position in a case in which the first optical filter is disposed on the optical path in a memory in advance, and changes a position of the in-focus position adjustment lens by referring to the in-focus position information depending on which of the first optical filter or the second optical filter is disposed on the optical path.

A fifteenth aspect of the present invention provides an image processing method that is executed by an image processing device including a processor, the image processing method comprising: via the processor, acquiring a visible image of a subject captured with light in a first wavelength range including a visible light wavelength range in a state where the subject is held in focus with the light in the first wavelength range; acquiring a first near-infrared image of the subject captured with light in a second wavelength range that includes a near-infrared light wavelength range and is different from the first wavelength range in a state where the subject is held in focus with the light in the first wavelength range; generating a first mask image showing a first region where an abnormality exists on a surface of the subject and a second region including a region where an abnormality exists inside the subject, based on the visible image and the first near-infrared image; acquiring a second near-infrared image of the subject captured with the light in the second wavelength range in a state where the subject is held in focus with the light in the second wavelength range; and extracting an abnormal region in the first region and the second region based on the first mask image and the second near-infrared image. The image processing method according to the fifteenth aspect may further execute the same configurations as those of the second to twelfth aspects.

A sixteenth aspect of the present invention provides an image processing method that is executed by an image processing device including a processor, the image processing method comprising: via the processor, acquiring a visible image of a subject captured with light in a first wavelength range including a visible light wavelength range in a state where the subject is held in focus with the light in the first wavelength range; acquiring a first near-infrared image of the subject captured with light in a second wavelength range that includes a near-infrared light wavelength range and is different from the first wavelength range in a state where the subject is held in focus with the light in the first wavelength range; generating a first mask image showing a first region where an abnormality exists on a surface of the subject and a second region including a region where an abnormality exists inside the subject, based on the visible image and the first near-infrared image; and determining whether or not to acquire a second near-infrared image of the subject captured with the light in the second wavelength range in a state where the subject is held in focus with the light in the second wavelength range, based on a detection result of the abnormality in the first mask image. The image processing method according to the sixteenth aspect may further execute the same configurations as those of the second to twelfth aspects.

A seventeenth aspect of the present invention provides an image processing program for causing an image processing device including a processor to execute an image processing method comprising: via the processor, acquiring a visible image of a subject captured with light in a first wavelength range including a visible light wavelength range in a state where the subject is held in focus with the light in the first wavelength range; acquiring a first near-infrared image of the subject captured with light in a second wavelength range that includes a near-infrared light wavelength range and is different from the first wavelength range in a state where the subject is held in focus with the light in the first wavelength range; generating a first mask image showing a first region where an abnormality exists on a surface of the subject and a second region including a region where an abnormality exists inside the subject, based on the visible image and the first near-infrared image; acquiring a second near-infrared image of the subject captured with the light in the second wavelength range in a state where the subject is held in focus with the light in the second wavelength range; and extracting an abnormal region in the first region and the second region based on the first mask image and the second near-infrared image. The image processing program according to the seventeenth aspect may further execute the same configurations as those of the second to twelfth aspects. A non-transitory recording medium recording a computer-readable code of the image processing program of these aspects is also included in the scope of the present invention.

An eighteenth aspect of the present invention provides an image processing program for causing an image processing device including a processor to execute an image processing method comprising: via the processor, acquiring a visible image of a subject captured with light in a first wavelength range including a visible light wavelength range in a state where the subject is held in focus with the light in the first wavelength range; acquiring a first near-infrared image of the subject captured with light in a second wavelength range that includes a near-infrared light wavelength range and is different from the first wavelength range in a state where the subject is held in focus with the light in the first wavelength range; generating a first mask image showing a first region where an abnormality exists on a surface of the subject and a second region including a region where an abnormality exists inside the subject, based on the visible image and the first near-infrared image; and determining whether or not to acquire a second near-infrared image of the subject captured with the light in the second wavelength range in a state where the subject is held in focus with the light in the second wavelength range, based on a detection result of the abnormality in the first mask image. The image processing program according to the eighteenth aspect may further execute the same configurations as those of the second to twelfth aspects. A non-transitory recording medium recording a computer-readable code of the image processing program of these aspects is also included in the scope of the present invention.

BRIEF DESCRIPTION OF THE DRAWINGS

FIG. 6 is a flowchart showing an imaging procedure in Example 1.

FIGS. 8A to 8C are diagrams conceptually showing a captured image and a mask image.

DESCRIPTION OF THE PREFERRED EMBODIMENTS

One embodiment of an image processing device, an imaging apparatus, an image processing method, and an image processing program according to the present invention is as follows. In the description, the accompanying drawings will be referred to as necessary.

First Embodiment

Configuration of Imaging Apparatus

Figure 1:
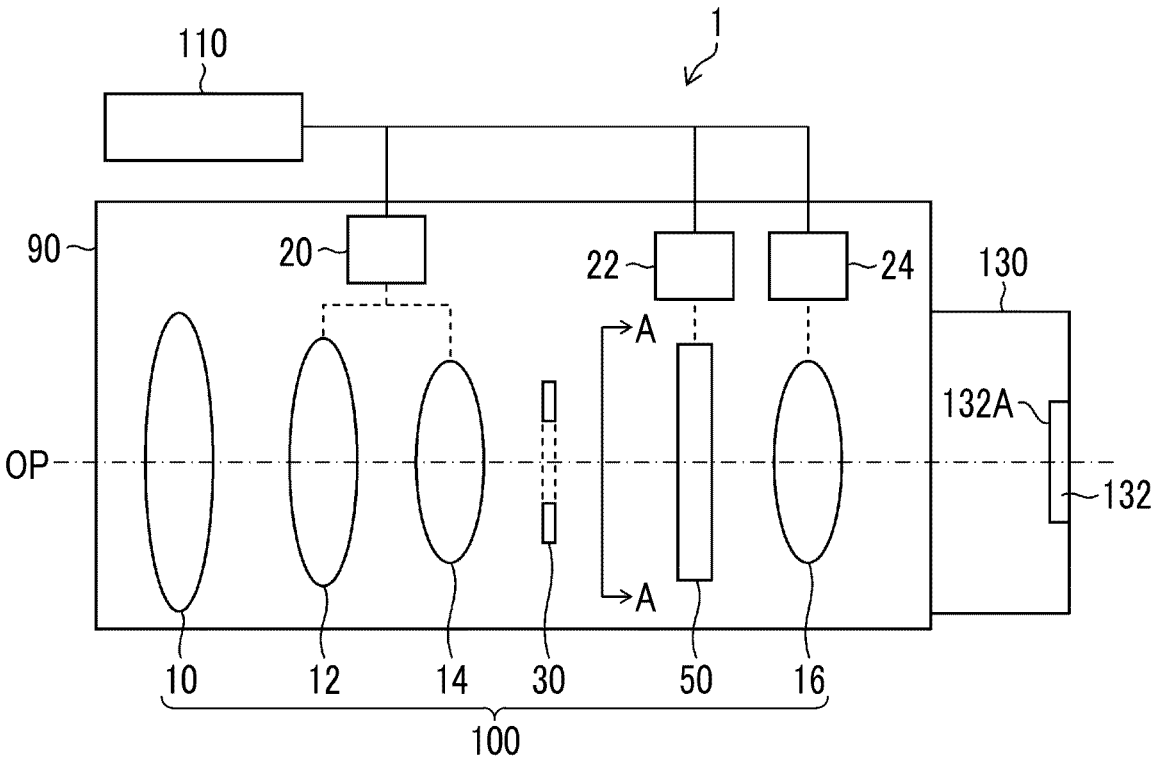
FIG. 1 is a diagram showing a schematic configuration of an imaging apparatus according to a first embodiment.

FIG. 1 is a diagram showing a schematic configuration of an imaging apparatus according to a first embodiment. As shown in FIG. 1, an imaging apparatus 1 (imaging apparatus) comprises an imaging lens 100 and an imaging unit 130. The imaging unit 130 comprises an imaging element 132.

Configuration of Imaging Lens

The imaging lens 100 is a lens having a plurality of lenses. The imaging lens 100 comprises, from an objective side to an image formation side, an objective lens 10, a focus lens 12, a zoom lens 14, a stop 30, an optical filter switching unit 50, and an adjustment lens 16. The term "objective side" refers to a side on which an imaging target (subject) exists, and the term "image formation side" refers to a side on which an optical image of the imaging target is formed, that is, a side on which the imaging element 132 exists. The term "imaging lens" means, for example, an optical system for forming the optical image of the imaging target on an imaging surface 132A of the imaging element 132 by the plurality of lenses. The "imaging lens" may include not only the lenses but also an optical element such as a stop, an optical filter, a half mirror, and/or a deflection element.

The objective lens 10 is fixed to a housing 90 that holds optical elements such as the lenses, and condenses light from the imaging target.

The focus lens 12 is an optical system that adjusts an in-focus position of a target image. The zoom lens 14 is an optical system that adjusts a zoom magnification. The focus lens 12 and the zoom lens 14 move forward and rearward along an optical axis OP (optical path) of the imaging lens 100 in conjunction with each other by, for example, a cam mechanism (not shown). Thereby, the magnification is changed, and the in-focus position is adjusted such that the in-focus position is brought to the imaging surface 132A of the imaging element 132. The focus lens 12 and the zoom lens 14 are driven by rotating, for example, a zoom cam (not shown) by a zoom lens drive mechanism 20. The zoom lens drive mechanism 20 is controlled by a control unit 110 (processor) in accordance with an instruction given to the imaging apparatus 1 from a user.

The stop 30 is an optical element that shields unnecessary light such as stray light and narrows luminous flux. The optical filter switching unit 50 (optical filter switching mechanism) is a device for switching to a different optical filter between imaging with visible light and imaging with near-infrared light. In FIG. 1, the stop 30 is disposed between the zoom lens 14 and the optical filter switching unit 50, but a position of the stop 30 is not limited to this.

For example, the stop 30 may be disposed to be movable between the focus lens 12 and the zoom lens 14.

Light Transmittance of Imaging Lens

The light transmittance of the imaging lens 100 (optical system) will be described. Each lens of the imaging lens 100 is coated to have a high light transmittance in a specific wavelength region of the visible light and the near-infrared light. The coating is preferably composed of a plurality of layer, such as a coating in which light-transmitting materials such as $TiO_2$, $Ta_2O_5$, $Al_2O_3$, $SiO_2$, and $MgF_2$ are laminated in a thin film shape on the lens surface. By adjusting a refractive index, a thickness, and the number of layers of the material forming a thin film, the light transmittance in the specific wavelength region can be increased, and the light transmittance in the specific wavelength region can be decreased. A coating material, a coating thickness, and the number of coating layers for increasing the light transmittance in the specific wavelength region and decreasing the light transmittance in the specific wavelength region can be designed by computer simulation or the like.

The light transmittance means a ratio of an intensity (intensity of emitted light) of light emitted from the lens to an intensity (intensity of incidence light) of light incident on the lens in a case in which light of a certain wavelength is incident on, for example, the lens, and is represented by the following expression.

Light transmittance (%) =

$100 \times$ "intensity of emitted light"/"intensity of incidence light"

Although shown in a simplified manner in FIG. 1, each of the objective lens 10, the focus lens 12, the zoom lens 14, and the adjustment lens 16 may be composed of a lens group of one or more lenses. The imaging lens 100 may be composed of several to several tens of lenses as a whole. Each lens of the imaging lens 100 is coated to have a high light transmittance in a specific wavelength range of the visible light and the near-infrared light (that is, to have a relatively low light transmittance in a wavelength range other than the specific wavelength range). The coating may be applied to only a part of all of the lenses. However, the coating is more preferably applied to all of the lenses.

Difference in In-Focus Position Between Visible Light and Near-Infrared Light In the above-mentioned imaging lens 100, there is a difference between focal positions of the visible light and the near-infrared light. The difference depends on the specific configuration of the optical system, and is, for example, about 0.5 mm to 2.0 mm. In a case in which imaging is performed in a state where the subject is held in focus with the visible light, a region in which the near-infrared light is emitted is in a defocus state.

Profile of Light Transmittance of Imaging Lens

Figure 2:
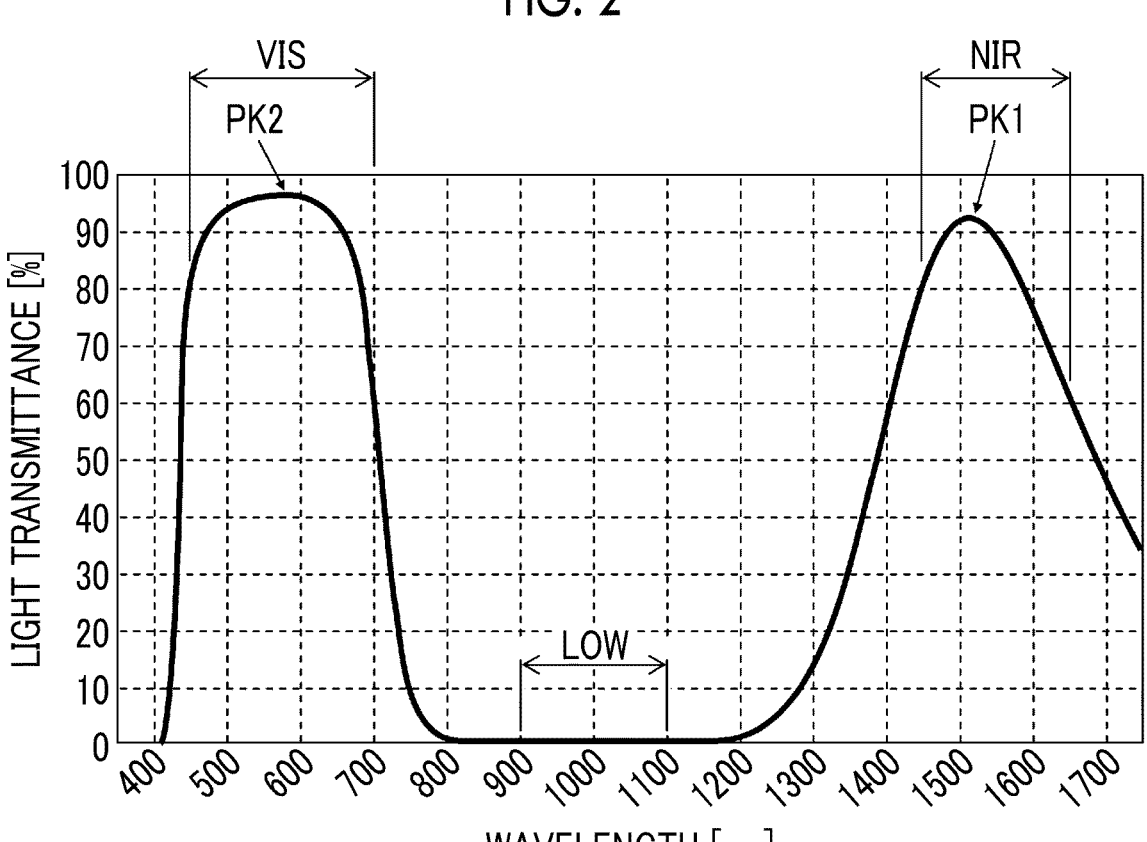
FIG. 2 is a graph showing a light transmittance profile of an imaging lens.

FIG. 2 is a graph showing a profile of the light transmittance of an imaging lens 100. In FIG. 2, a horizontal axis indicates the wavelength, and a vertical axis indicates the light transmittance of the imaging lens 100. As shown in FIG. 2, the profile of the light transmittance of the imaging lens 100 has a first light transmittance peak PK1 in a near-infrared light peak wavelength region NIR of 1450 nm to 1650 nm. That is, a light transmittance on a short wavelength side of the near-infrared light peak wavelength region NIR is reduced as the wavelength becomes shorter from a light transmittance at a short wavelength end (1450 nm) of the near-infrared light peak wavelength region NIR. In addition, a light transmittance on a long wavelength side of the near-infrared light peak wavelength region NIR is reduced as the wavelength becomes longer from a light transmittance at a long wavelength end (1650 nm) of the near-infrared light peak wavelength region NIR.

As is perceived from FIG. 2, a light transmittance at the first light transmittance peak PK1 is about 92% at a wavelength of 1520 nm. In addition, a light transmittance in a range of a wavelength of 1490 nm to 1560 nm is 90% or more.

In addition, the profile of the light transmittance of the imaging lens 100 has a second light transmittance peak PK2 in a visible light peak wavelength region VIS of 450 nm to 700 nm. That is, a light transmittance on a short wavelength side of the visible light peak wavelength region VIS is reduced as the wavelength becomes shorter from a light transmittance at a short wavelength end (450 nm) of the visible light peak wavelength region VIS. In addition, a light transmittance on a long wavelength side of the visible light peak wavelength region VIS is reduced as the wavelength becomes longer from a light transmittance at a long wavelength end (700 nm) of the visible light peak wavelength region VIS.

As is perceived from FIG. 2, a light transmittance at the second light transmittance peak PK2 is about 96% at a wavelength of 570 nm to 580 nm. In addition, a light transmittance in a range of a wavelength of 480 nm to 660 nm is 90% or more.

In addition, a light transmittance in a wavelength region on a short wavelength side in a blue wavelength region included in a visible light wavelength region is lower than a light transmittance in a wavelength region on a long wavelength side in the blue wavelength region. Specifically, a light transmittance in a wavelength region equal to or less than 450 nm of the blue wavelength region is lower than a light transmittance in a wavelength region longer than 450 nm. In addition, a light transmittance in a wavelength of 400 nm to 430 nm is 50% or less. In a case in which the light transmittance in the wavelength of 400 nm to 430 nm is increased above 50%, a light transmittance in a wavelength of 1200 nm to 1290 nm that is a third harmonic and is a peak of a near-infrared wavelength band is also increased. This means that a peak of a near-infrared wavelength region is widened, and there is a possibility that a light transmittance near a wavelength of 1550 nm is decreased, or that deterioration of characteristics such as remaining of ripples occurs.

Furthermore, the imaging lens 100 has a low light transmittance region LOW having a lower light transmittance than in the near-infrared light peak wavelength region and the visible light peak wavelength region across a wavelength of 900 nm to 1100 nm between the near-infrared light peak wavelength region and the visible light peak wavelength region. The light transmittance in the low light transmittance region LOW is preferably 5% or less. The low light transmittance region LOW is a region that occurs along with formation of a light transmittance peak for the near-infrared light region in the near-infrared light peak wavelength region NIR and formation of a light transmittance peak for the visible light wavelength region in the visible light peak wavelength region VIS. However, a wavelength of the low light transmittance region LOW is a wavelength region that does not contribute to any of imaging with the visible light or imaging with the near-infrared light, so that the low light transmittance in the low light transmittance region LOW does not cause a problem.

The profile of the light transmittance shown in FIG. 2 has one light transmittance peak PK1 in the near-infrared light peak wavelength region NIR and one light transmittance peak PK2 in the visible light peak wavelength region VIS. However, the profile of the light transmittance of the present disclosure is not limited to this. The near-infrared light peak wavelength region NIR may have a shape (ripples) of a waveform formed by a plurality of light transmittance peaks. In addition, the visible light peak wavelength region VIS may have ripples. The ripples are a shape showing one characteristic of changes in light transmittance. In such a manner, the profile need only have a light transmittance peak in the near-infrared light peak wavelength region NIR and have a light transmittance peak in the visible light peak wavelength region VIS, and presence or absence of the ripples, that is, the number of light transmittance peaks is not limited.

A half-width of the first light transmittance peak PK1 formed in the near-infrared light peak wavelength region NIR may be as narrow as possible. Near-infrared light that has a longer wavelength than the visible light is likely to show chromatic aberration compared to the visible light in a case in which a wavelength range is widened. Accordingly, the wavelength range for imaging is preferably as narrow as possible.

The profile of the light transmittance shown in FIG. 2 is obtained by applying a coating such that a light transmittance peak of a ⅓ wavelength of a fundamental wave that is generated from the fundamental wave having a light transmittance peak in the near-infrared light peak wavelength region due to interference caused by the coating exists in the visible light peak wavelength region. The fundamental wave preferably has a peak near 1550 nm. By configuring the coating such that a light transmittance peak of a ½ wavelength of the fundamental wave is not shown, and that a light transmittance peak of a ⅓ wavelength is increased, a light transmittance profile satisfying the above condition is obtained. Designing and forming the coating with which the light transmittance profile satisfying the above condition is obtained can be performed using the technique in the related art.

Optical Filter Switching Unit

Figure 3:
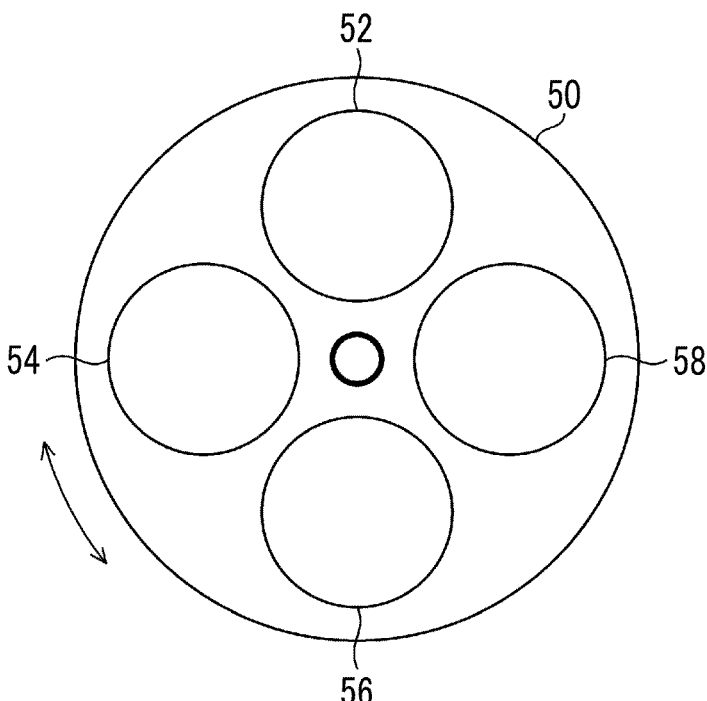
FIG. 3 is a schematic diagram of an optical filter switching unit seen from an A-A direction of FIG. 1.

As shown in FIG. 3 (a schematic diagram of an optical filter switching unit seen from an A-A direction of FIG. 1), the optical filter switching unit 50 is a turret type switching device in which four optical filters 52, 54, 56, and 58 are disposed in a circular plate. This switching device disposes each optical filter on the optical path OP by rotating the circular plate by a turret drive mechanism 22 such as a motor. The rotation may be clockwise or counterclockwise. The optical filter switching unit 50 comprises a sensor (not shown) for detecting the filter disposed on the optical path OP. An installation location of the sensor may be the turret drive mechanism 22 instead of the optical filter switching unit 50. The turret drive mechanism 22 is controlled by the control unit 110 (processor; a turret drive unit 116) in accordance with an instruction given to the imaging apparatus 1 from the user.

In FIG. 1, the optical filter switching unit 50 is disposed between the zoom lens 14 and the adjustment lens 16, but a position of the optical filter switching unit 50 is not limited to this. The optical filter switching unit 50 can be disposed between the target object side of the objective lens 10 and the image formation side of the adjustment lens 16. For example, the optical filter switching unit 50 may be disposed between the adjustment lens 16 and the imaging element 132.

The imaging apparatus 1 may be configured such that the housing 90 accommodating the imaging lens 100 is separable from the imaging unit 130. For example, the imaging apparatus 1 may be configured such that the housing 90 is an interchangeable lens unit, the imaging unit 130 is a camera unit, and any of a plurality of types of lens units is attachable to one camera unit. In this case, the optical filter switching unit 50 may be disposed in the imaging unit 130, that is, the camera unit.

The optical filter 52 (second optical filter) is a bandpass filter that reduces a light transmittance in at least a part of the wavelength range of the near-infrared light. The phrase "light transmittance in at least a part of the wavelength range of the near-infrared light" refers to, for example, a light transmittance related to a light transmission region in a near-infrared light region of the imaging lens 100. Here, the term "near-infrared light region" refers to, for example, a wavelength region equal to or more than 1100 nm in the near-infrared light wavelength region. In addition, the phrase "light transmission region in the near-infrared light region" refers to, for example, a near-infrared light peak wavelength region described below. The optical filter 52 (bandpass filter) is one example of a second optical filter according to the technique of the present disclosure. The optical filter 52 is disposed on the optical path OP in a case in which imaging is performed by the imaging apparatus 1 with light in a first wavelength range including the visible light wavelength range.

The optical filter 54 (first optical filter) is a bandpass filter that reduces a light transmittance in at least a part of the wavelength range of the visible light. The phrase "light transmittance in at least a part of the wavelength range of the visible light" refers to a light transmittance related to a light transmission region in a visible light region of the imaging lens 100. Here, the term "visible light region" refers to, for example, a wavelength region equal to or less than 800 nm. In addition, the phrase "light transmission region in the visible light region" refers to, for example, a visible light peak wavelength region described below. The optical filter 54 is disposed on the optical path OP (on the optical path) in a case in which imaging is performed with light in a second wavelength range that includes the near-infrared light wavelength range and that is different from the first wavelength range.

The optical filter 56 is a transparent glass plate having a refractive index close to that of the other optical filters 52, 54, and 58. In the present embodiment, the term "transparent" means that the visible light and the near-infrared light are transmitted. In a case of not using the other optical filters 52, 54, and 58, the optical filter 56 is an optical path length adjustment filter for keeping an optical path length as unchanged as possible from an optical path length in a case of using the optical filters 52, 54, and 58. The optical filter 58 is a neutral density (ND) filter for adjusting the amount of light.

An ND value that is a product of a refractive index and a thickness of the optical filter 52 is greater than an ND value that is a product of a refractive index and a thickness of the optical filter 54. This is for decreasing a difference between an in-focus position for the visible light and an in-focus position for the near-infrared light by decreasing a difference in optical path length in a case of switching between the visible light and the near-infrared light as light of the imaging target. That is, although the optical filter 52 transmits the visible light, a focal length for the visible light is shorter than a focal length for the near-infrared light. Therefore, the optical path length is increased by setting the ND value of the optical filter 52 to be greater than the ND value of the optical filter 54 that transmits the near-infrared light. By this configuration, a deviation between the in-focus position for the visible light and the in-focus position for the near-infrared light can be decreased. A configuration for changing the ND value of the optical filter 52 and the ND value of the optical filter 54 is advantageous in a case in which a deviation between the in-focus position for the visible light and the in-focus position for the near-infrared light cannot be adjusted by only the adjustment lens 16 described below.

Adjustment Lens

The adjustment lens 16 (in-focus position adjustment lens) is a lens for adjusting a difference between the focal length for the visible light and the focal length for the near-infrared light in a case of switching between the optical filter 52 and the optical filter 54. The focal length for the near-infrared light having a longer wavelength than the visible light is longer than the focal length for the visible light. In a case in which the focus lens 12 and the zoom lens 14 are configured to move in conjunction with each other to align the in-focus position at variable magnification for the visible light with the imaging surface 132A of the imaging element 132, the in-focus position for the near-infrared light cannot be adjusted. Therefore, in a case of performing imaging with the near-infrared light, that is, in a case in which the optical filter 54 (first optical filter) is disposed on the optical path OP, the adjustment lens 16 is moved to align the in-focus position with the imaging surface 132A based on in-focus position data (in-focus position information) described below.

The adjustment lens 16 is driven by an adjustment lens drive mechanism 24. The adjustment lens drive mechanism 24 is controlled by the control unit 110 (processor; an adjustment lens drive unit 118) in accordance with an instruction from the user. Specifically, the control unit 110 controls the adjustment lens drive mechanism 24 such that a position of the adjustment lens 16 is adjusted to the in-focus position in accordance with an imaging condition provided as an instruction by the user. Here, the imaging condition refers to, for example, selection of the visible light or the near-infrared light and selection of the zoom magnification based on the instruction of the user. The in-focus position of the adjustment lens 16 refers to the position of the adjustment lens 16 for forming an image of light on the imaging surface 132A of the imaging element 132 in the in-focus state.

Alternatively, the control unit 110 may adjust the position of the adjustment lens 16 based on the in-focus position data by identifying the optical filter disposed on the optical path OP based on filter position information from the sensor disposed in the optical filter switching unit 50. For example, in a case in which the user provides an instruction to perform imaging with the visible light to the control unit 110 via an input unit 28 described below, the optical filter 52 is disposed on the optical path OP by the control unit 110. In a case in which the user provides an instruction to perform imaging with the near-infrared light to the control unit 110 via the input unit 28, the optical filter 54 is disposed on the optical path OP by the control unit 110. The control unit 110 detects a type of the optical filter on the optical path OP by the sensor disposed in the optical filter switching unit 50, and adjusts the position of the adjustment lens 16 based on the detected type of the optical filter. The adjustment lens 16 can also be used for adjusting a flange back in a case of interchanging the imaging unit 130.

The configuration of the imaging lens 100 is not limited to the above-mentioned aspect. For example, various forms of a lens configuration of a zoom lens or a focus lens are known, and various configurations for zoom control or focus control (such as moving the entire lens group or moving a part of the lens group) are also known. These configurations can be adopted in the present invention.

Imaging Element

The imaging element 132 (imaging element) is a device that converts an optical image of the imaging target formed by the imaging lens 100 into an electric signal to output an image signal, and can be configured using an image sensor having sensitivity to both the visible light and the near-infrared light, such as an indium gallium arsenic (InGaAs) sensor.

Configuration of Computer

Figure 4:
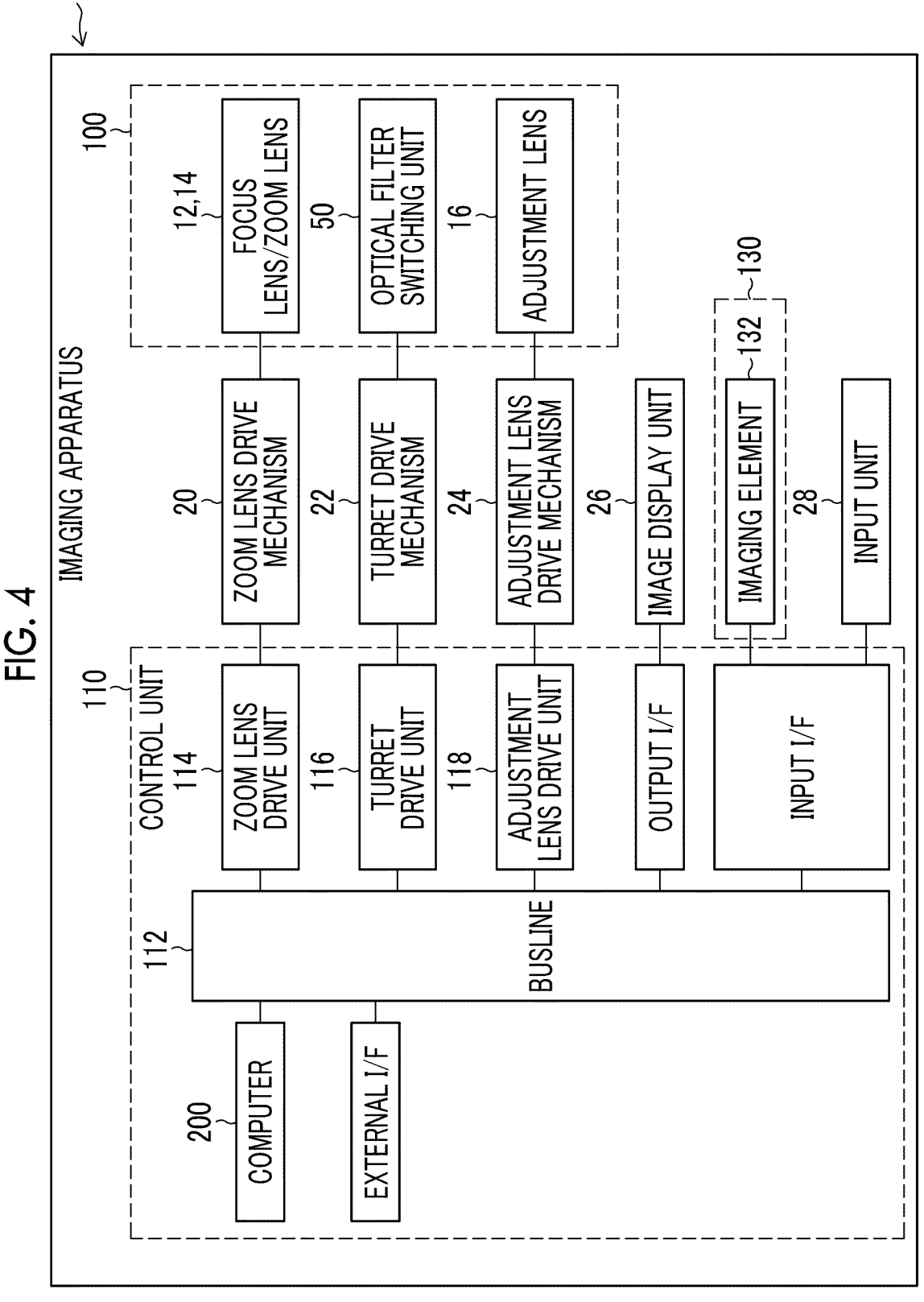
FIG. 4 is a block diagram showing a schematic configuration of the imaging apparatus.
Figure 5:
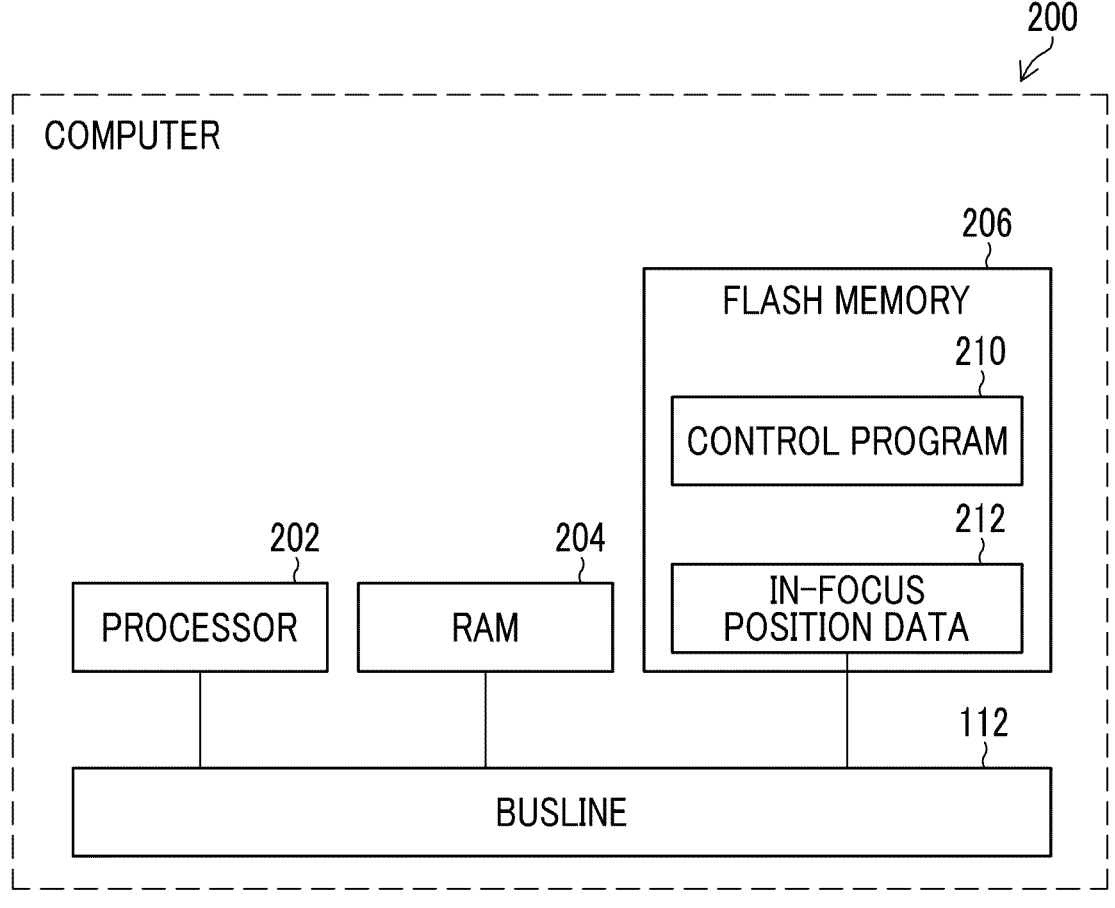
FIG. 5 is a diagram showing a schematic configuration of a computer.

As an example, as shown in FIG. 4 (a block diagram showing a schematic configuration of the imaging apparatus), the imaging apparatus 1 is controlled by the control unit 110 (processor). The control unit 110 comprises a computer 200 (processor). As an example, as shown in FIG. 5 (a diagram showing a schematic configuration of the computer), the computer 200 includes a processor 202 (processor), a random access memory (RAM) 204, and a flash memory 206, which are connected to each other through a bus line 112.

The processor 202 controls the entire imaging apparatus 1. The RAM 204 is, for example, a volatile memory that is used as a work area or the like in a case of executing a control program. The flash memory 206 (memory) is, for example, a non-volatile memory (non-transitory recording medium) for storing a control program 210 (image processing program) used for the control of the imaging apparatus 1 (including an execution of an image processing method according to the present invention) and the in-focus position data 212 (in-focus information). A non-transitory recording medium such as a read only memory (ROM) or an electrically erasable programmable read-only memory (EEPROM) may be used instead of the flash memory 206.

Function of Processor

The processor 202 (processor) having the above-described configuration has a function of performing the following processing.

(1) Switching of optical filter (2) Focus control, zoom control, and adjustment of in-focus position (3) Determination of acquisition of visible image, first near-infrared image, and second near-infrared image, and acquisition of image based on determination (4) Generation of mask image (5) Extraction of abnormal region (6) Operation as first and second neural networks (7) Image processing (one or more of brightness adjustment, brightness correction, image height conversion, enlargement or reduction, deformation, distortion correction, binarization, point image restoration, and contour extraction)

(8) Display control (including identification display) of image and/or image processing result, and output control to recording medium such as flash memory 206

These functions of the processor 202 can be configured, for example, by using one or a plurality of processors such as a central processing unit (CPU), a graphics processing unit (GPU), a field programmable gate array (FPGA), and a programmable logic device (PLD).

Procedure of Image Processing

A procedure of the image processing by the imaging apparatus 1 having the above-described configuration will be described as being divided into image acquisition patterns (combinations of which wavelength range of light is used to focus on the subject and which wavelength range of light is used to capture the image).

Example 1

Imaging in Example 1

First, imaging in Example 1 will be described. FIG. 6 is a flowchart showing an example of an imaging procedure in Example 1. As shown in FIG. 6, in Example 1, a visible image, a first near-infrared image, and a second near-infrared image are acquired. The order of the image acquisition may be different from the example described below. The following description of "the processor 202 executes processing" includes a case in which the processor 202 executes the processing using the RAM 204 and/or the flash memory 206 and a case in which the processor 202 (computer 200) executes the processing via other parts constituting the control unit 110.

In a case in which the processor 202 (processor) is instructed to capture a visible image and a first near-infrared image by an instruction to the input unit 28 from the user (YES in step S100), the computer 200 disposes the optical filter 52 (second optical filter) on the optical path OP (step S110). The optical filter 52 is an optical filter that reduces (cuts) a transmittance of at least a part of the near-infrared light (light in the second wavelength range). The processor 202 causes the subject to be held in focus with light in the first wavelength range (light including a wavelength range of the visible light) via the zoom lens drive unit 114, the zoom lens drive mechanism 20, and the like (step S120), and captures a visible image in the in-focus state (step S130).

Similarly, the processor 202 (processor) disposes the optical filter 54 (first optical filter) that reduces a transmittance of at least a part of the visible light on the optical path OP (step S140), and causes the subject to be held in focus with the light in the first wavelength range (step S150). In this case, the processor 202 adjusts (changes) the position of the adjustment lens 16 (in-focus position adjustment lens) with reference to the in-focus position data 212 (in-focus position information) stored in the flash memory 206 (memory), and aligns the in-focus position with the imaging surface 132A. The processor 202 captures the first near-infrared image in this in-focus state (step S160).

Similarly, in a case in which the processor 202 is instructed to capture a second near-infrared image by an instruction to the input unit 28 from the user (YES in step S170), the processor 202 disposes the optical filter 54 (first optical filter) that reduces a transmittance of at least a part of the visible light on the optical path OP (step S180), and causes the subject to be held in focus with the light in the second wavelength range (light in a wavelength range that includes a near-infrared light wavelength range and that is different from the first wavelength range) (step S190). The processor 202 captures the second near-infrared image in this in-focus state (step S200).

The processor 202 repeats the above procedure until a necessary image is acquired (until YES in step S210). The control unit 110 can make the determination of step S210 based on an instruction to the input unit 28 from the user. The processor 202 may display the captured images (visible image, first near-infrared image, and second near-infrared image) on a display device such as an image display unit 26 so that the user can check the images.

Image Processing in Example 1

Figure 7:
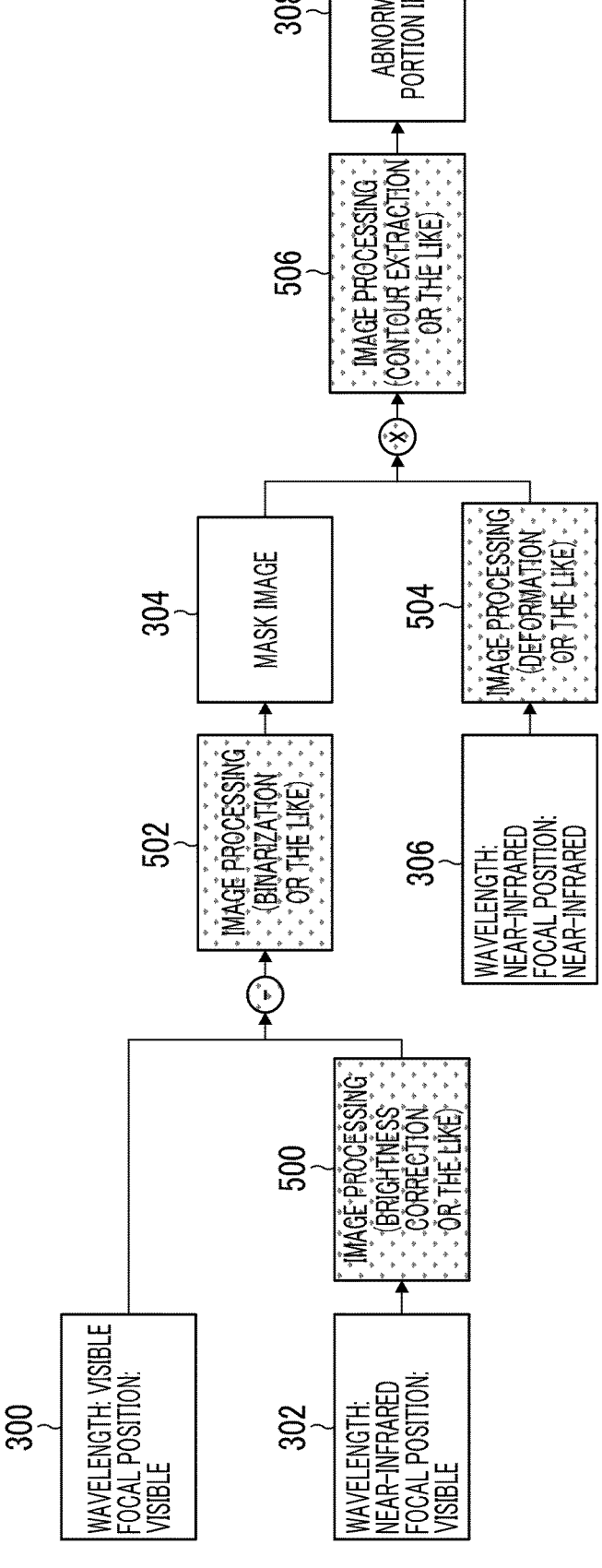
FIG. 7 is a diagram showing a procedure of image processing in Example 1.

FIG. 7 is a diagram showing a procedure of image processing in Example 1. The processor 202 may perform the image processing shown in FIG. 7 after capturing all the images (for example, after the entire processing in FIG. 6 is ended), or may perform the imaging and the image processing in parallel.

Generation of First Mask Image

The processor 202 performs image processing 500, for example, image processing of matching brightness with a visible image 300 (visible image), on the first near-infrared image 302 (first near-infrared image), and performs image processing 502 such as binarization on a difference between the visible image 300 and the processed first near-infrared image 302, thereby generating a mask image 304 (first mask image). Since the mask image 304 (first mask image) is an image that is based on a difference between the visible image and the near-infrared image, it is an image that roughly shows an abnormal portion (abnormal region) on the surface and an internal abnormal portion (abnormal region), but a position, a size, and a shape of the abnormal portions shown in the image are not necessarily accurate. This is due, for example, to the fact that, in the first near-infrared image, since the subject is held in focus with the visible light, the internal abnormal portion may be defocused (blurred) and appear in a position, a size, and a shape different from the actual state.

FIGS. 8A to 8C are diagrams conceptually showing a captured image and a mask image. FIG. 8A shows a visible image 320 (visible image). In the visible image 320, an abnormal region 322 (first region) on the surface is clear, but an internal abnormal region 324 (second region) can hardly be discriminated. On the other hand, FIG. 8B shows a first near-infrared image 330. Since the first near-infrared image 330 is captured with the light in the second wavelength range including the near-infrared light, an abnormal region 322A (corresponding to the abnormal region 322; first region) on the surface can hardly be discriminated. In addition, since the imaging is performed in an in-focus state with the light in the first wavelength range including the visible light, an internal abnormal region 326 (second region) is blurred and appears larger than an actual abnormal region 324A (second region). A plurality of abnormal regions may exist on the surface and/or the inside.

FIG. 8C shows a first mask image 340 (first mask image) generated based on the visible image 320 and the first near-infrared image 330. In a region 342 (first region) corresponding to the abnormal region 322 (first region) on the surface and the abnormal region 322A (first region) and a region 346 (second region; it is wider than a region 344A, which is a true abnormal region) corresponding to the internal abnormal region 324 (second region) and the abnormal region 326 (second region), a pixel value is 1 (uncolored portion in FIG. 8C), and in the other region, a pixel value is zero (black portion in FIG. 8C).

Extraction of Abnormal Region

Figures 9A, 9B, 9C, 9D:
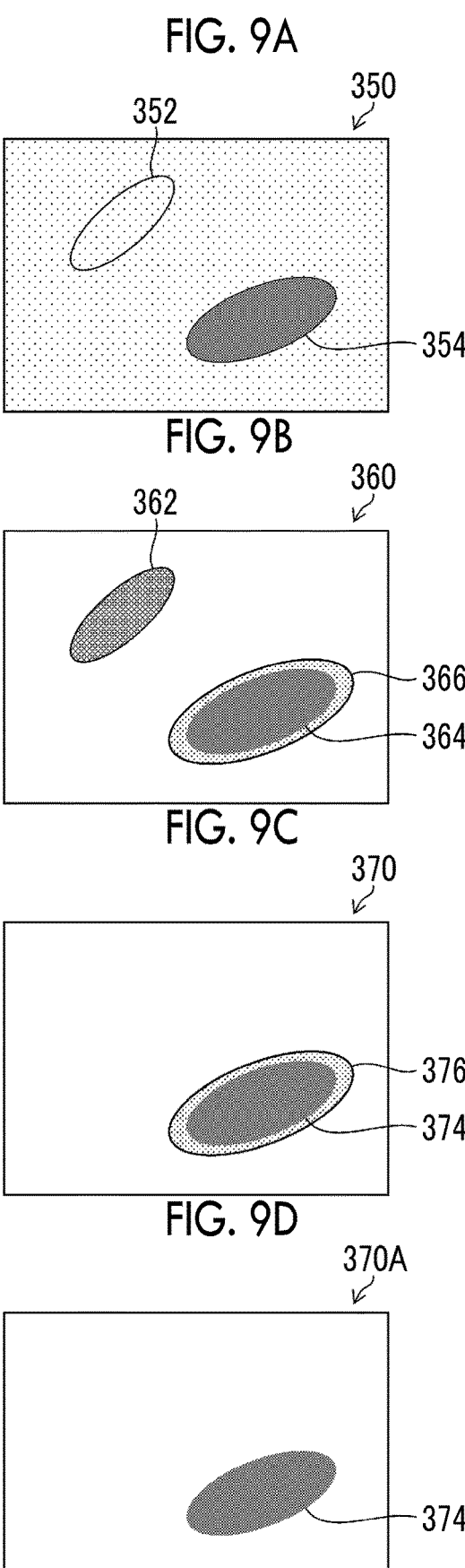
FIGS. 9A to 9D are diagrams conceptually showing images obtained by the image processing.

The processor 202 performs image processing 504 such as deformation on the second near-infrared image 306 (second near-infrared image), multiplies the obtained second near-infrared image 306 by the mask image 304, and performs image processing 506 such as contour extraction on a result of the multiplication, thereby generating an abnormal portion image 308 (see FIG. 7). FIGS. 9A to 9D are diagrams conceptually showing images obtained by the image processing, and FIG. 9A shows a second near-infrared image 350 (second near-infrared image). In the second near-infrared image 350, an abnormal region 352 (first region) on the surface can hardly be discriminated. However, since the second near-infrared image 350 is an image captured in a state where the subject is held in focus with the light in the second wavelength range including the near-infrared light, an internal abnormal region 354 (second region) clearly appears.

The processor 202 may perform image processing such as deformation according to an in-focus position for the visible light (light in the first wavelength range) and correct a result of the image processing, based on the visible image and the first near-infrared image. Thereby, accuracy of deformation and the like can be improved.

FIG. 9B shows a result (an image 360; corresponding to the abnormal portion image 308 of FIG. 7) obtained by multiplying the second near-infrared image 350 and the first mask image 340.

In the image 360, an abnormal region 362 on the surface of the subject is extracted to have substantially the same size as the actual abnormal region and the abnormal region 352 in the second near-infrared image, but, for the inside of the subject, an abnormal region 366 larger than an actual abnormal region 364 is extracted.

The processor 202 can decide whether each abnormal region is the abnormal region (first region) on the surface or the internal abnormal region (second region) by comparing the second near-infrared image 350 with the first mask image 340. In the example shown in FIGS. 9A to 9D, since the abnormal region 352 in the second near-infrared image 350 has substantially the same size as the region 342 of the first mask image 340, it can be decided that the abnormal region 352 is an abnormal region on the surface, and since the abnormal region 354 is smaller than the region 346, it can be determined that the abnormal region 354 is "a region (second region) where an abnormality exists inside the subject".

The processor 202 can extract a region determined to be "an internal abnormal region". For example, as shown in FIG. 9C, the abnormal region 366 (including the abnormal region 364) determined to be "an internal abnormal region" can be extracted from the image 360 which is a multiplication result. In an image 370 shown in FIG. 9C, abnormal regions 374 and 376 correspond to the abnormal regions 366 and 364, respectively. In addition, as shown in FIG. 9D, the processor 202 may extract the internal abnormal region from the second near-infrared image 350 to generate an image 370A (the abnormal region 374 corresponds to the abnormal region 354).

Figure 10A:
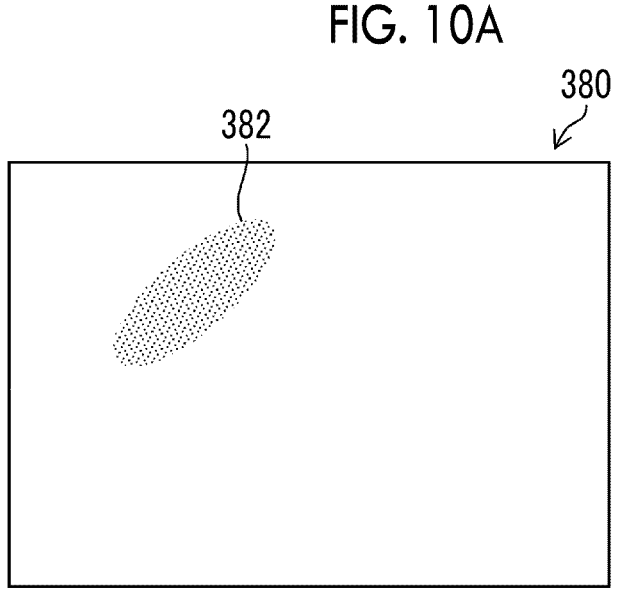
FIGS. 10A and 10B are other diagrams conceptually showing images obtained by the image processing.
Figure 10B:
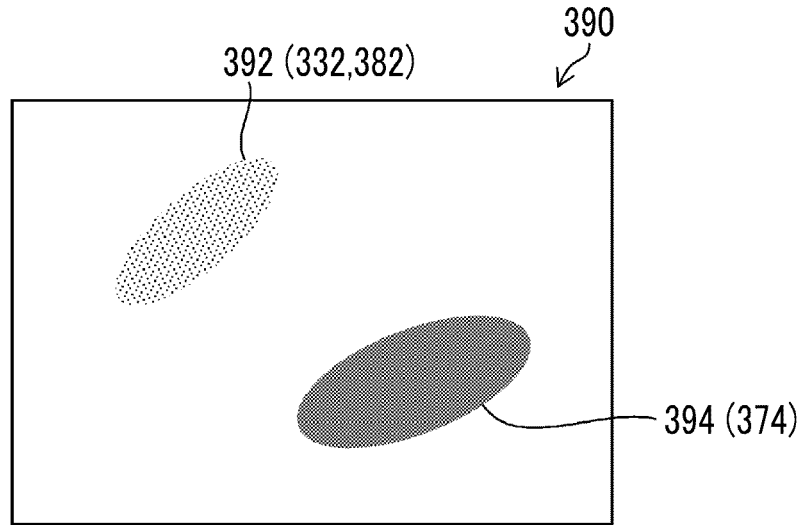

Similarly, the processor 202 can extract the abnormal region 322 decided to be "an abnormal region on the surface" from the visible image 320. An example of such extraction is an image 380 shown in FIG. 10A (another diagram conceptually showing an image obtained by the image processing) (an abnormal region 382 corresponds to the abnormal region 322). As shown in FIG. 10B, the processor 202 may combine an abnormal region 392 (corresponding to the abnormal regions 322 and 382) on the surface and an internal abnormal region 394 (corresponding to the abnormal region 374) in one image 390 to generate an image 390. In addition, the processor 202 may extract a region (normal region) other than the abnormal region from the visible image or the first and second near-infrared images and may further combine the extracted region.

Image Processing, Identification Display, and the Like

Figures 11A, 11B:
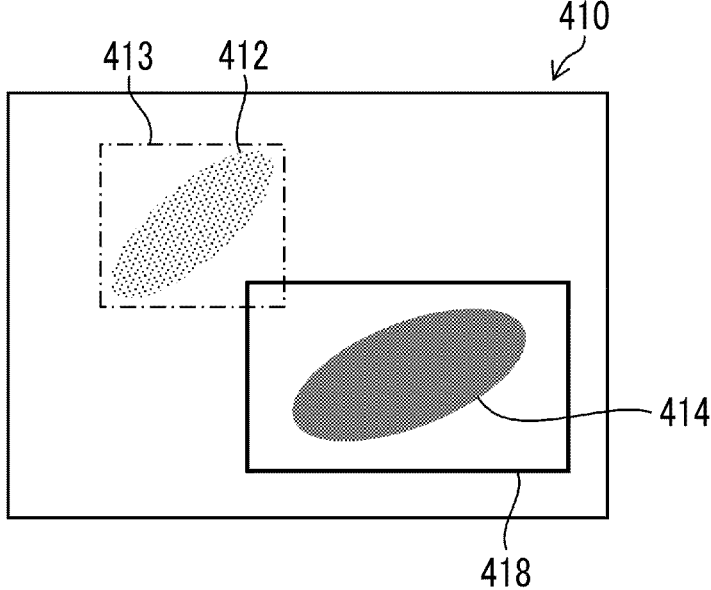
FIGS. 11A and 11B are still another diagrams conceptually showing images obtained by the image processing.

The processor 202 can perform various types of image processing and/or identification display on the generated image. For example, as shown in FIG. 11A (still another diagram conceptually showing an image obtained by the image processing), peripheral edge portions of the abnormal region on the surface and the internal abnormal region may be extracted as contours 402 and 404 to generate an image 400. In a case in which the contours are extracted in this way, a size, a shape, or the like of the abnormal region can be easily measured. The processor 202 may perform image processing on the generated images (visible image, first near-infrared image, second near-infrared image, and image generated using these images), and extract the contours by using the images that have passed through the image processing.

As shown in FIG. 11B, the processor 202 may add frame lines (bounding boxes) 413 and 418 to extracted abnormal regions 412 and 414 to identify and display the abnormal regions 412 and 414. In addition, the processor 202 may perform contour enhancement of the abnormal region, coloring including identification display such as color coding depending on whether the abnormal region is on the surface or inside, filling, or the like.

The processor 202 may perform image processing and/or identification display on the visible image, the first near-infrared image, and the second near-infrared image instead of an image obtained by extracting the abnormal region or a composite image. In addition, the processor 202 can cause the image display unit 26 (display device) or the like to display a result of the image processing and/or the identification display.

In addition to or instead of displaying the generated images, the processor 202 may measure and output a feature amount (position, size, shape, quantity, or the like) of the abnormal region. The processor 202 can perform such measurement based on a known image processing technique (including a method of machine learning such as a neural network).

The processor 202 can record the generated images, the measurement result, and the like in association with each other on a recording medium such as the flash memory 206.

Effect of Example 1

As described above, in Example 1, the abnormal region on the surface is extracted from the visible image, the first mask image is generated using the visible image and the first near-infrared image, and the position, the size, and the shape of the internal abnormal region are roughly extracted. Then, it is possible to extract the internal abnormal region with high accuracy using the first mask image and the second near-infrared image.

Determination on Acquisition of Second Near-Infrared Image

Although a final abnormal portion image (an abnormal portion image 308 in FIG. 7) is generated using three images (visible image, first near-infrared image, and second near-infrared image) in Example 1 described above, the abnormal portion image can also be generated using a part of the three images. For example, the computer 200 (processor) may decide (determine) "whether or not to capture the second near-infrared image" using the visible image and the first near-infrared image. In a case in which it is determined to acquire the second near-infrared image, the computer 200 (processor) can extract the abnormal region by the above-described procedure. In a case in which an abnormality is not detected at all or almost no abnormality is detected in the visible image and the first near-infrared image, a processing time can be shortened by not capturing the second near-infrared image for improving detection accuracy of the abnormality.

The phrase "deciding (determining) using the visible image and the first near-infrared image" refers to, for example, deciding (determining) based on a detection result of an abnormality in the first mask image or based on a detection result of an abnormality in a difference image (an image before generating the first mask image by binarization or the like) between the visible image and the first near-infrared image in a case of generating the first mask image.

In addition, "whether or not to capture the second near-infrared image" may be decided based on a difference in wavelength (for example, a difference in peak wavelength or a difference central wavelength) between the visible image and the first near-infrared image instead of or in addition to the detection result of the abnormality. This is because in a case in which the difference in wavelength between the visible image and the first near-infrared image is small, the defocus amount is small and thus a degree of improvement in detection accuracy by using the second near-infrared image is also low.

Modification Example of Example 1

Figure 12:
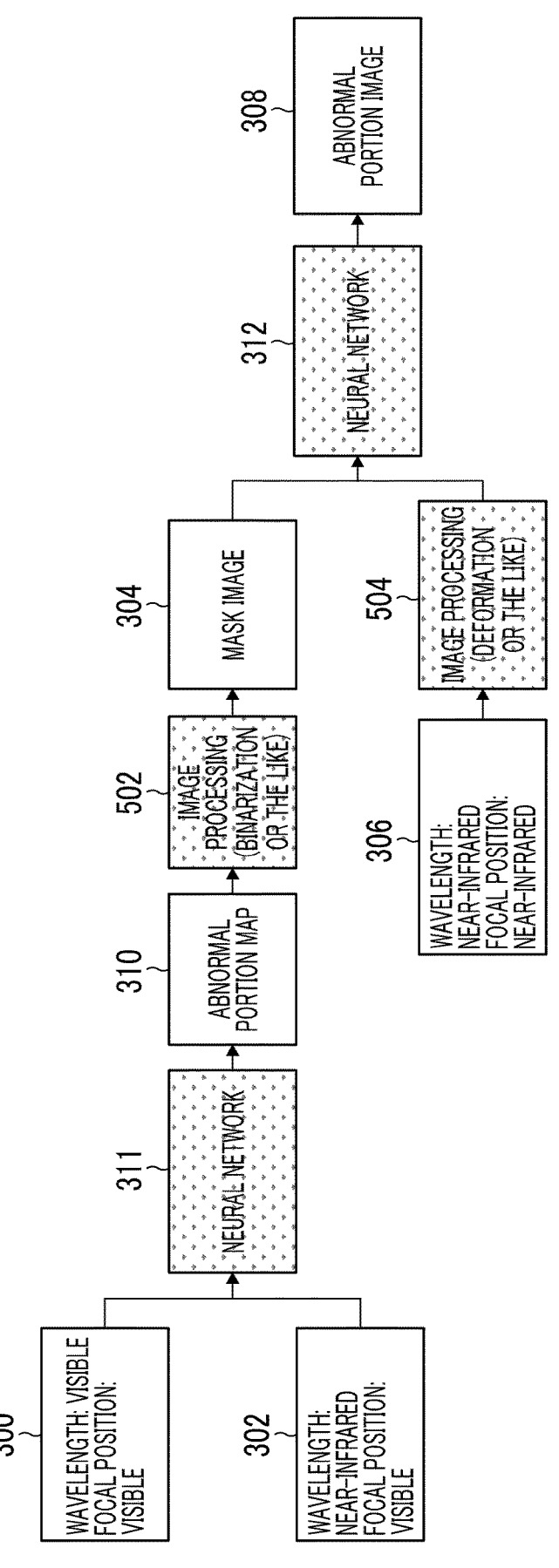
FIG. 12 is a diagram showing a procedure of image processing in a modification example of Example 1.

The images acquired in the modification example are the same as those of Example 1 (visible image, first near-infrared image, and second near-infrared image). Therefore, the imaging can be performed using the same procedure (refer to FIG. 6) as in Example 1. The modification example is different from Example 1 in that a neural network is used in the image processing. FIG. 12 is a diagram showing a procedure of image processing in the modification example of Example 1. The computer 200 (the control unit 110; the processor) inputs the visible image 300 and the first near-infrared image 302 to a neural network 311 (first neural network) for abnormality detection to generate an abnormal portion map 310, and performs image processing such as binarization on the abnormal portion map 310 to generate the mask image 304 (first mask image). Then, the computer 200 inputs the mask image 304 and the second near-infrared image that has passed through the image processing 504 described above to a neural network 312 (first neural network) for abnormality detection to generate the abnormal portion image 308. The neural networks 311 and 312 can perform image multiplication internally.

The neural networks 311 and 312 can be realized by, for example, a deep neural network (DNN), a convolutional neural network (CNN), a recurrent neural network (RNN), a U-NET, or the like (including a derived version or an improved version thereof), but are not limited to these examples, and various neural networks can be used.

Configuration and the Like of Neural Network

In the modification example, the computer 200 may use a neural network having characteristics (described below) according to a feature of an abnormality to be detected, as the neural networks 311 and 312. The term "feature of abnormality" refers to, for example, whether the abnormality is an abnormality on the surface or an internal abnormality, and the type (fissuring, peeling, bubbles, foreign matter, dent, cavity, or the like), number, size, and shape (which may include a fluctuation range of these items) of the abnormality, but is not limited to these items. In a case in which the imaging apparatus 1 includes a plurality of neural networks, the computer 200 may switch the neural network according to a feature of an abnormality to be detected, and use the neural network as the neural network 311 and/or the neural network 312. Thereby, an appropriate characteristic network can be selected according to the feature of the abnormality.

The neural network 311 and the neural network 312 may be neural networks having the same layer configuration (layer structure). The term "same layer configuration" refers to, for example, a repetition pattern of a convolutional layer and a pooling layer, the presence or absence or the number of fully connected layers, the presence or absence of a branch or a pattern thereof, or the like, but is not limited to these points.

The neural networks 311 and 312 can be constructed by a method of machine learning. In a case of performing learning, a weight coefficient in a state where learning is performed for one neural network of the neural network 311 (first neural network) and the neural network 312 (second neural network) is used as an initial value of a weight coefficient in the other neural network, to perform learning for the other neural network. By such a procedure, learning can be efficiently performed. In learning, a mask image or an abnormal portion image can be provided as training data.

In addition, the neural network 311 and the neural network 312 may change characteristics while adopting the same layer configuration. The phrase "changing characteristics" includes, for example, that the neural network 312 increases the number of filters in the convolutional layer, increases a filter size, reduces the number of strides of the filter, reduces the number of dilations, or reduces a filter size of max pooling, relative to the neural network 311, but the characteristics to be changed are not limited to these items. In the modification example, the neural network 312 is used to detect the abnormal portion with higher accuracy than the neural network 311, and for this purpose, it is effective to change the characteristics as described above.

The neural network 311 and/or the neural network 312 may be a two-stage neural network. Specifically, for example, these neural networks may comprise a neural network for subject detection for detecting the subject from the image (visible image, first near-infrared image, and second near-infrared image), and a neural network for abnormality detection for detecting an abnormality in the detected subject.

Although the case in which the neural network 311 and the neural network 312 have the same layer configuration has been described above, the neural network 311 and the neural network 312 may have different layer configurations.

Example 2

Another example of the image processing in the present invention will be described. In Example 2, wavelength ranges in which the first near-infrared image and the second near-infrared image are acquired are different from those in Example 1 and the modification example thereof described above.

Figure 13:
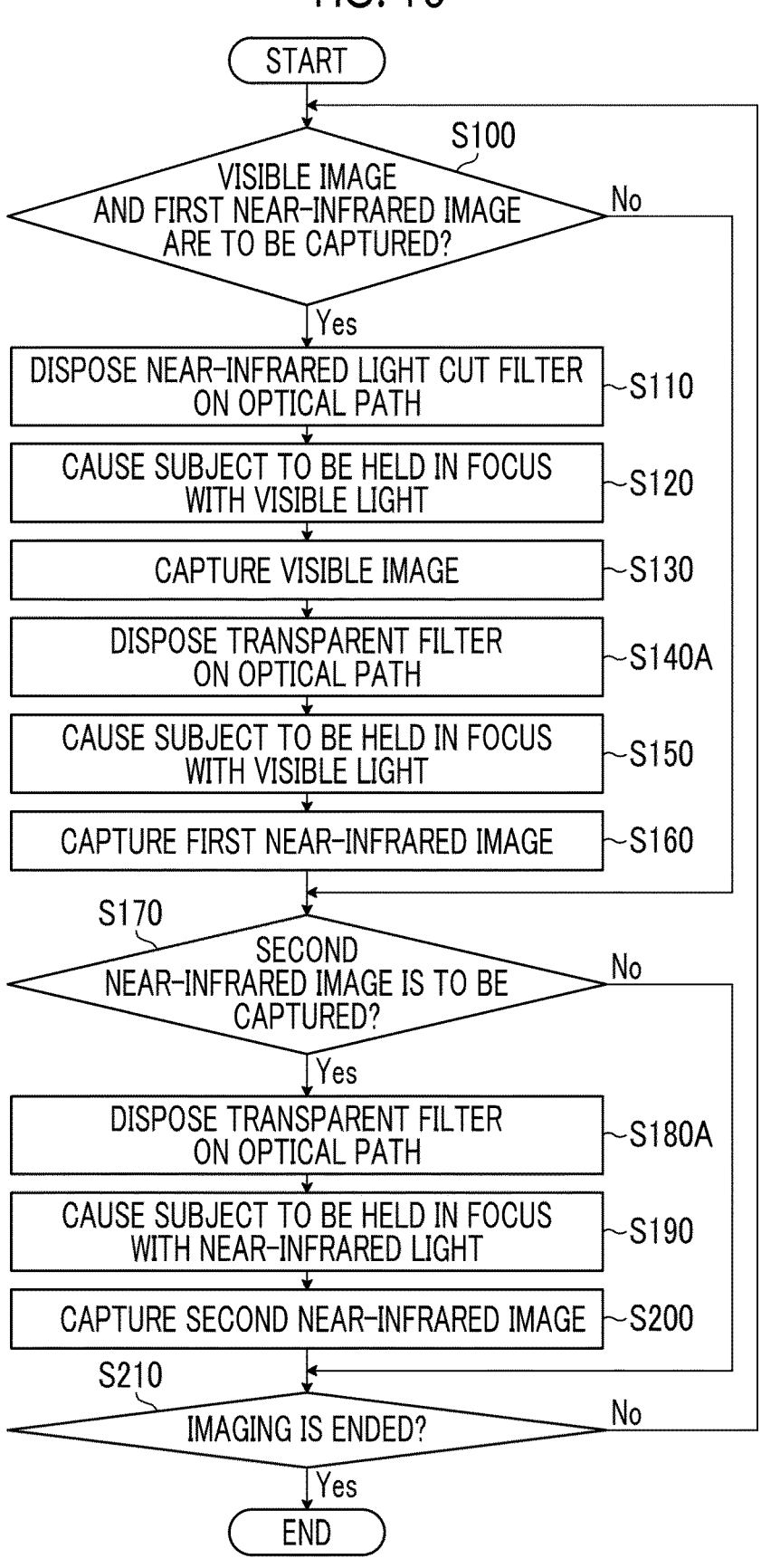
FIG. 13 is a flowchart showing an imaging procedure in Example 2.

FIG. 13 is a flowchart showing an imaging procedure in Example 2. Focusing on a difference from FIG. 6, the computer 200 (processor) disposes the transparent optical filter 56 on the optical path OP (step S140A) to allow the visible light and the near-infrared light to transmit through the imaging lens 100, causes the subject to be held in focus with the visible light (light in first wavelength range) in this state (step S150), and captures the first near-infrared image (step S160). Similarly, the computer 200 disposes the transparent optical filter 56 on the optical path OP (step S180A) to allow the visible light and the near-infrared light to transmit through the imaging lens 100, causes the subject to be held in focus with the near-infrared light (light in second wavelength range) in this state (step $190), and captures the second near-infrared image (step S200).

Figure 14:
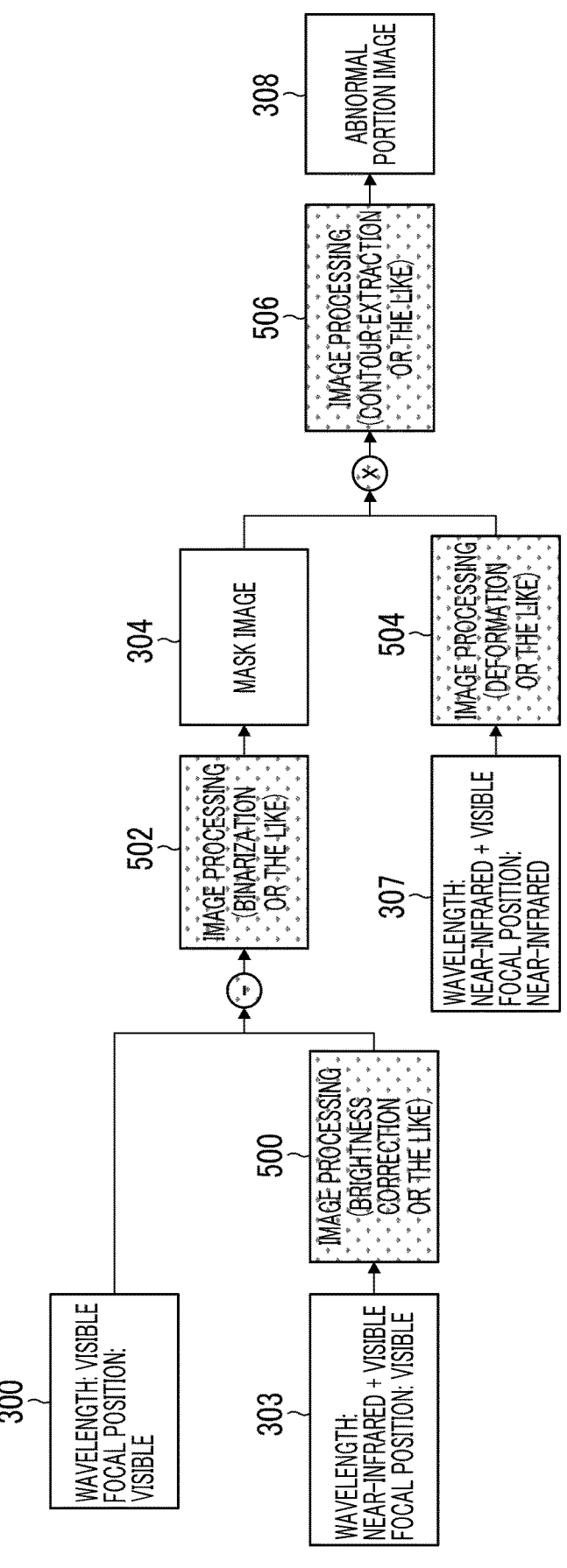
FIG. 14 is a diagram showing a procedure of image processing in Example 2.

FIG. 14 is a diagram showing a procedure of image processing in Example 2. In FIG. 14, a first near-infrared image 303 is the first near-infrared image acquired in step S160 of FIG. 13, and a second near-infrared image 307 is the second near-infrared image acquired in step S200. Other processing can be performed in the same manner as in Example 1 (refer to FIG. 7) to generate the abnormal portion image 308. In Example 2 as well, image processing, identification display of images, combination, recording, and the like can be performed in the same manner as in Example 1 and the modification example thereof.

Example 3

Another example of the image processing in the present invention will be described. Example 3 is different from Example 1 and the modification example thereof, and Example 2 described above in that two mask images are used. The acquired image (wavelength range, in-focus state) is the same as that in Example 2, and can be captured by the same procedure as in FIG. 13.

Figure 15:
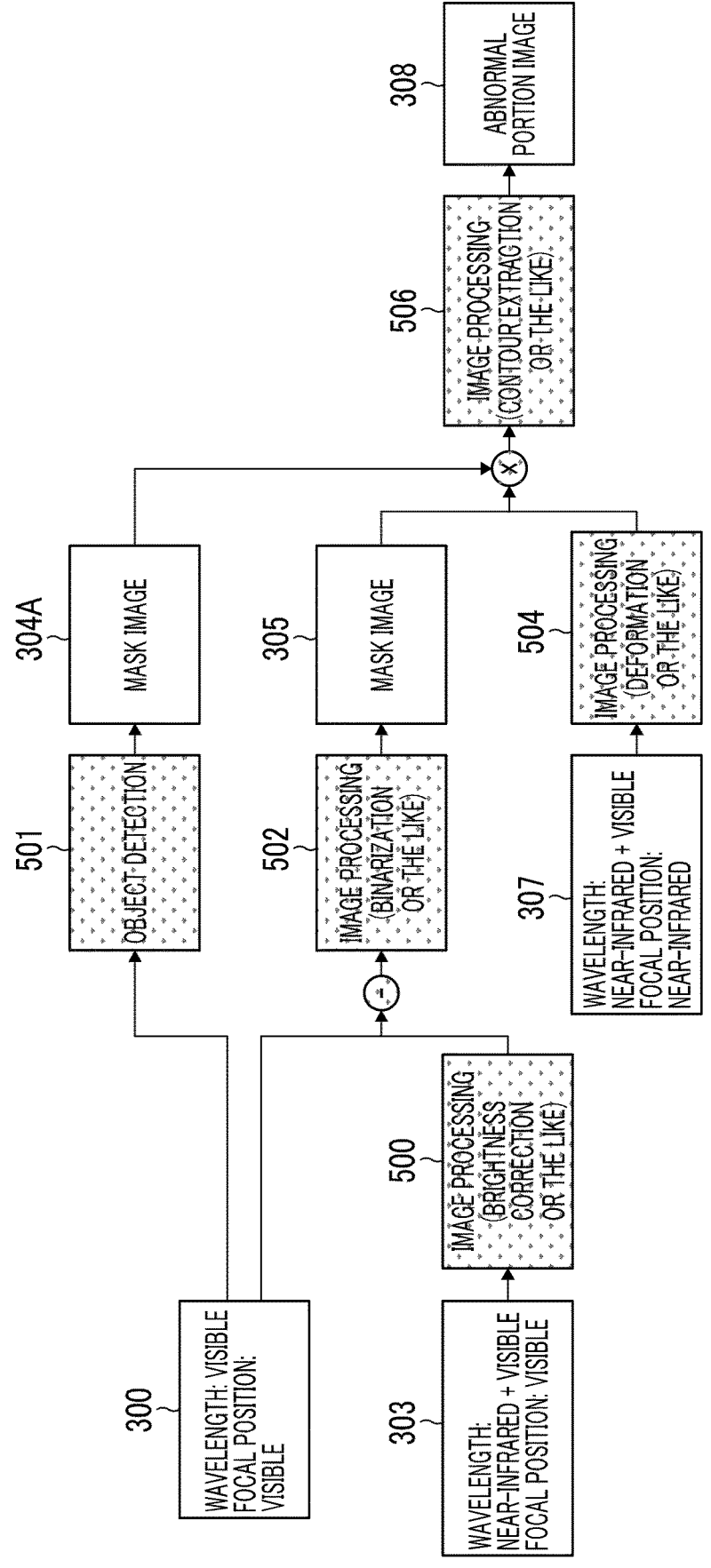
FIG. 15 is a diagram showing a procedure of image processing in Example 3.

FIG. 15 is a diagram showing a procedure of image processing in Example 3. As shown in FIG. 15, in Example 3, the computer 200 (processor) performs image processing 501 of object detection on the visible image 300 and generates a mask image 304A (second mask image) based on a result of the detection. The image processing 501 may be performed by a neural network. The computer 200 multiplies the second near-infrared image 307 after being passed through the image processing 504, the mask image 305 (first mask image) by the mask image 304A (second mask image), and performs image processing 506 such as contour extraction on a result of a result of the multiplication to generate the abnormal portion image 308.

Modification Example of Example 3

Figure 16:
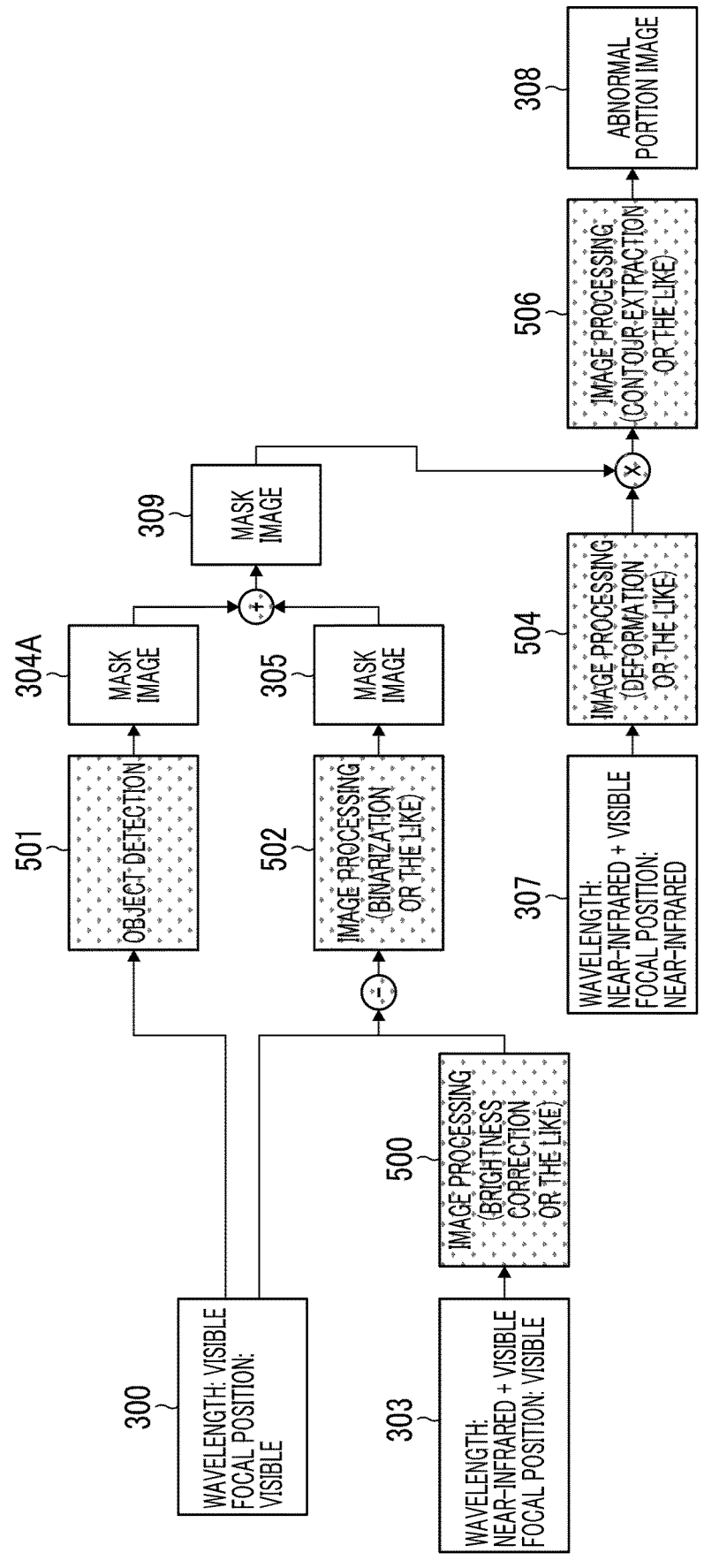
FIG. 16 is a diagram showing image processing in a modification example of Example 3.

In the example shown in FIG. 15, the abnormal portion image 308 is generated based on the multiplication of three images, but the abnormal portion image 308 may be generated using a different pattern therefrom. Specifically, as shown in FIG. 16 (diagram showing image processing in a modification example of Example 3), the computer 200 may generate a mask image 309 (third mask image) by calculating a logical sum of the mask image 305 (first mask image) and the mask image 304A (second mask image), and multiply the second near-infrared image 307 after the image processing 504 by the mask image 309. The subsequent processing of generating the abnormal portion image 308 can be performed in the same manner as the example in FIG. 15.

In above-described Example 3 as well, image processing, identification display of images, combination, recording, and the like can be performed in the same manner as in Example 1 and the modification example thereof, and Example 2.

Example of Another Configuration of Imaging Apparatus

In the present invention, an image may be acquired by an imaging apparatus having a configuration different from that of the imaging apparatus 1.

Figure 17A:
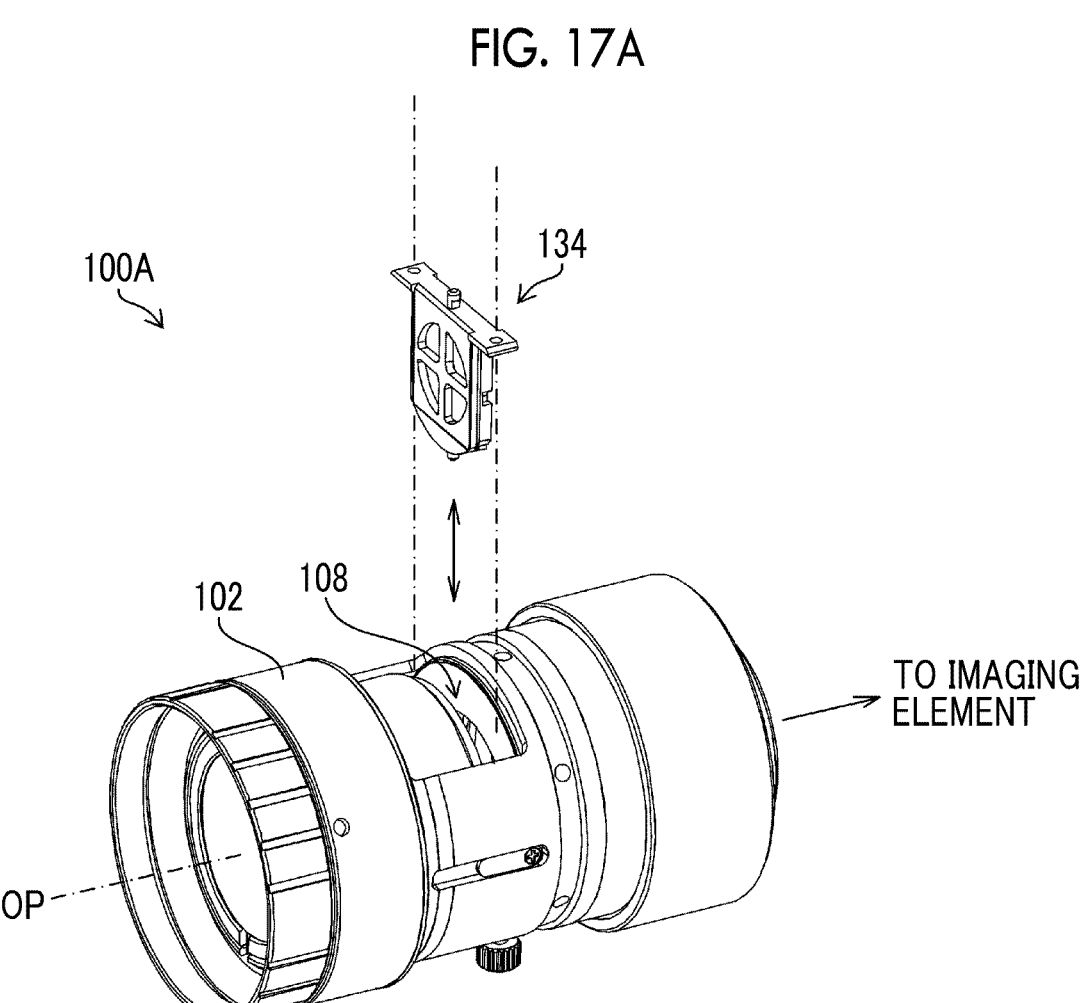
FIGS. 17A and 17B are diagrams showing a configuration of a pupil split type optical system.
Figure 17B:
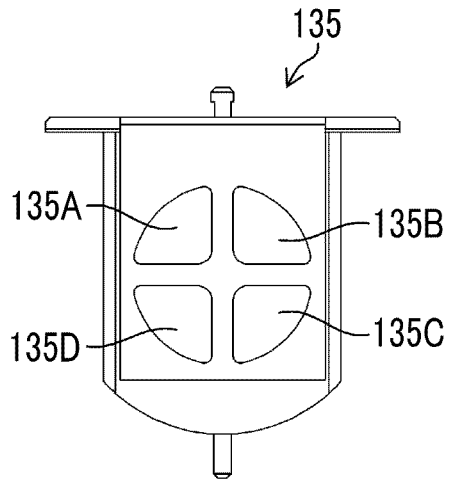

FIGS. 17A and 17B are diagrams showing a configuration of a pupil split type optical system. A lens device 100A shown in FIGS. 17A and 17B comprises a housing 102 that accommodates a zoom lens and a focus lens. As these lenses, lenses that transmit the visible light and the near-infrared light can be used as in the imaging lens 100 described above.

In the housing 102, a slit 108 is formed at a pupil position of the optical system or a position near the pupil, and a filter unit 134 is inserted into the slit 108. The filter unit 134 comprises a frame 135, and the frame 135 is provided with aperture regions 135A to 135D. An optical filter (second optical filter; the above-described optical filter 52 or the like) that transmits the visible light (light in the first wavelength range) by reducing the transmittance of the near-infrared light, and an optical filter (first optical filter; the above-described optical filter 54 or the like) that transmits the near-infrared light (light in the second wavelength range) by reducing the transmittance of the visible light are disposed in these aperture regions. An optical filter (transparent optical filter such as the above-described optical filter 56) that transmits both the visible light and the near-infrared light may be disposed in any aperture region. In addition, an optical filter that transmits the visible light may be composed of color filters corresponding to the respective colors of red (R), green (G), and blue (B) so that a color image can be acquired. Only a part of the aperture regions may be used to shield the remaining aperture regions.

In a case of the pupil split type optical system shown in FIGS. 17A and 17B, an imaging element that selectively receives light transmitted through any of the aperture regions 135A to 135D is used. In this imaging element, a pixel for the visible light and a pixel for the near-infrared light can be disposed. A pixel that receives both the visible light and the near-infrared light may be provided. A color filter may be disposed on the pixel for the visible light. In addition, selective light reception may be realized by disposing a polarizer that transmits light in a specific polarization direction in the aperture region and/or the imaging element. It is possible to simultaneously acquire a visible image and a near-infrared image based on an image signal output by the imaging element having such a configuration.

In this case, it is preferable to perform demosaicing of the image signal according to an arrangement pattern of the pixels.

Examples of Observation Target and Abnormal Region in Present Invention

In the present invention, agricultural and marine products, cultural assets and works of art, industrial products such as pipes, resin plates, and metal plates, and structures (concrete structures are also acceptable) such as bridges, roads, dams, tunnels, and buildings can be used as the observation target (subject). In a case in which these are observed, the abnormal region is, for example, a surface damage, an internal dent, or a cavity, but as described above, the "abnormal region" in the present invention is not limited to a region where inconvenience or defect exists.

In addition, in the present invention, a living body (for example, a luminal organ) can be used as the observation target. In this case, for example, blood vessels or lesions near a surface of a mucous membrane and blood vessels or lesions in a deep part (inside) can be observed as the "abnormal region".

Although the embodiment of the present invention and the modification example have been described above, it is needless to say that the present invention is not limited to the aspects described above, and various modifications can be made without departing from the gist of the present invention.

EXPLANATION OF REFERENCES

1: imaging apparatus
10: objective lens
12: focus lens
14: zoom lens
16: adjustment lens
20: zoom lens drive mechanism
22: turret drive mechanism
24: adjustment lens drive mechanism
26: image display unit
28: input unit
30: stop
50: optical filter switching unit
52: optical filter
54: optical filter
56: optical filter
58: optical filter
90: housing
100: imaging lens
100A: lens device
102: housing
108: slit
110: control unit
112: busline
114: zoom lens drive unit
116: turret drive unit
118: adjustment lens drive unit
130: imaging unit
132: imaging element
132A: imaging surface
134: filter unit
135: frame
135A: aperture region
135B: aperture region
135C: aperture region
135D: aperture region 200: computer
202: processor
204: RAM
206: flash memory
210: control program
212: in-focus position data
300: visible image
302: first near-infrared image
303: first near-infrared image
304: mask image
304A: mask image
305: mask image
306: second near-infrared image
307: second near-infrared image
308: abnormal portion image
309: mask image
310: abnormal portion map
311: neural network
312: neural network
320: visible image
322: abnormal region
322A: abnormal region
324: abnormal region
324A: abnormal region
326: abnormal region
330: first near-infrared image
340: first mask image
342: region
344A: region
346: region
350: second near-infrared image
352: abnormal region
354: abnormal region
360: image
362: abnormal region
364: abnormal region
366: abnormal region
370: image
370A: image
374: abnormal region
376: abnormal region
380: image
382: abnormal region
390: image
392: abnormal region
394: abnormal region
400: image
402: contour
404: contour
412: abnormal region
413: frame line
414: abnormal region
418: frame line
500: image processing
501: image processing
502: image processing
504: image processing
506: image processing
LOW: low light transmittance region
NIR: near-infrared light peak wavelength region
VIS: visible light peak wavelength region
OP: optical axis
PK1: first light transmittance peak
PK2: second light transmittance peak
S100 to S210: steps of image processing method

What is claimed is:

1. An image processing device comprising:
a processor,
wherein the processor
    acquires a visible image of a subject captured with light in a first wavelength range including a visible light wavelength range in a state where the subject is held in focus with the light in the first wavelength range,
    acquires a first near-infrared image of the subject captured with light in a second wavelength range that includes a near-infrared light wavelength range and is different from the first wavelength range in a state where the subject is held in focus with the light in the first wavelength range,
    generates a first mask image showing a first region where an abnormality exists on a surface of the subject and a second region including a region where an abnormality exists inside the subject, based on the visible image and the first near-infrared image,
    acquires a second near-infrared image of the subject captured with the light in the second wavelength range in a state where the subject is held in focus with the light in the second wavelength range, and
    extracts an abnormal region in the first region and the second region based on the first mask image and the second near-infrared image.

2. The image processing device according to claim 1, wherein the processor acquires images, which are captured using a near-infrared light wavelength range as the second wavelength range, as the first near-infrared image and the second near-infrared image.

3. The image processing device according to claim 1, wherein the processor acquires images, which are captured using a wavelength range including visible light and near-infrared light as the second wavelength range, as the first near-infrared image and the second near-infrared image.

4. The image processing device according to claim 1, wherein the processor generates the first mask image based on a difference between the visible image and the first near-infrared image.

5. The image processing device according to claim 1, wherein the processor generates the first mask image by inputting the visible image to a first neural network for abnormality detection.

6. The image processing device according to claim 1, wherein the processor generates a second mask image by inputting the visible image or the first near-infrared image to a second neural network for abnormality detection, and extracts the abnormal region by further using the second mask image.

7. The image processing device according to claim 1, wherein the processor extracts a peripheral edge portion of the abnormal region as a contour.

8. The image processing device according to claim 1, wherein the processor determines whether or not to acquire the second near-infrared image based on a detection result of the abnormal region in the first mask image.

9. The image processing device according to claim 1, wherein the processor determines whether or not to acquire the second near-infrared image based on a difference between the first wavelength range and the second wavelength range.

10. The image processing device according to claim 1, wherein the processor displays a region where the first mask image exists in the visible image and/or the first near-infrared image such that the region is identified from the other region.

11. An imaging apparatus comprising:
an optical system that transmits light in a first wavelength range and light in a second wavelength range;
an optical filter switching mechanism for disposing, on an optical path of the optical system, any of a first optical filter that reduces a transmittance of at least a part of the light in the first wavelength range or a second optical filter that reduces a transmittance of at least a part of the light in the second wavelength range;
an imaging element that outputs an image signal corresponding to the light transmitted through the optical system, the first optical filter, or the second optical filter; and
the image processing device according to claim 1,
wherein the processor acquires the visible image, the first near-infrared image, and the second near-infrared image based on the image signal output from the imaging element.

12. The imaging apparatus according to claim 11, wherein the optical system includes an in-focus position adjustment lens, and
the processor
    stores in-focus position information indicating an in-focus position in a case in which the first optical filter is disposed on the optical path in a memory in advance, and
    changes a position of the in-focus position adjustment lens by referring to the in-focus position information depending on which of the first optical filter or the second optical filter is disposed on the optical path.

13. An image processing device comprising:
a processor,
wherein the processor
    acquires a visible image of a subject captured with light in a first wavelength range including a visible light wavelength range in a state where the subject is held in focus with the light in the first wavelength range,
    acquires a first near-infrared image of the subject captured with light in a second wavelength range that includes a near-infrared light wavelength range and is different from the first wavelength range in a state where the subject is held in focus with the light in the first wavelength range,
    generates a first mask image showing a first region where an abnormality exists on a surface of the subject and a second region including a region where an abnormality exists inside the subject, based on the visible image and the first near-infrared image, and
    determines whether or not to acquire a second near-infrared image of the subject captured with the light in the second wavelength range in a state where the subject is held in focus with the light in the second wavelength range, based on a detection result of the abnormality in the first mask image.

14. The image processing device according to claim 13, wherein, in a case in which it is determined to acquire the second near-infrared image, the processor
    acquires the second near-infrared image, and
    extracts an abnormal region in the first region and the second region based on the first mask image and the second near-infrared image.

15. An imaging apparatus comprising:

an optical system that transmits light in a first wavelength range and light in a second wavelength range;

an optical filter switching mechanism for disposing, on an optical path of the optical system, any of a first optical filter that reduces a transmittance of at least a part of the light in the first wavelength range or a second optical filter that reduces a transmittance of at least a part of the light in the second wavelength range;

an imaging element that outputs an image signal corresponding to the light transmitted through the optical system, the first optical filter, or the second optical filter; and the image processing device according to claim 13, wherein the processor acquires the visible image, the first near-infrared image, and the second near-infrared image based on the image signal output from the imaging element.

16. The imaging apparatus according to claim 15, wherein the optical system includes an in-focus position adjustment lens, and the processor stores in-focus position information indicating an in-focus position in a case in which the first optical filter is disposed on the optical path in a memory in advance, and changes a position of the in-focus position adjustment lens by referring to the in-focus position information depending on which of the first optical filter or the second optical filter is disposed on the optical path.

17. An image processing method that is executed by an image processing device including a processor, the image processing method comprising:

via the processor, acquiring a visible image of a subject captured with light in a first wavelength range including a visible light wavelength range in a state where the subject is held in focus with the light in the first wavelength range;

acquiring a first near-infrared image of the subject captured with light in a second wavelength range that includes a near-infrared light wavelength range and is different from the first wavelength range in a state where the subject is held in focus with the light in the first wavelength range;

generating a first mask image showing a first region where an abnormality exists on a surface of the subject and a second region including a region where an abnormality exists inside the subject, based on the visible image and the first near-infrared image;

acquiring a second near-infrared image of the subject captured with the light in the second wavelength range in a state where the subject is held in focus with the light in the second wavelength range; and extracting an abnormal region in the first region and the second region based on the first mask image and the second near-infrared image.

18. A non-transitory, computer-readable tangible recording medium on which a program for causing a processor provided to an image processing device to execute the image processing method according to claim 17 is recorded.

19. An image processing method that is executed by an image processing device including a processor, the image processing method comprising:

via the processor, acquiring a visible image of a subject captured with light in a first wavelength range including a visible light wavelength range in a state where the subject is held in focus with the light in the first wavelength range;

acquiring a first near-infrared image of the subject captured with light in a second wavelength range that includes a near-infrared light wavelength range and is different from the first wavelength range in a state where the subject is held in focus with the light in the first wavelength range;

generating a first mask image showing a first region where an abnormality exists on a surface of the subject and a second region including a region where an abnormality exists inside the subject, based on the visible image and the first near-infrared image; and determining whether or not to acquire a second near-infrared image of the subject captured with the light in the second wavelength range in a state where the subject is held in focus with the light in the second wavelength range, based on a detection result of the abnormality in the first mask image.

20. A non-transitory, computer-readable tangible recording medium on which a program for causing a processor provided to an image processing device to execute the image processing method according to claim 19 is recorded.

* * * * *